(12) United States Patent
Smith et al.

(10) Patent No.: US 9,101,519 B2
(45) Date of Patent: Aug. 11, 2015

(54) LEVELING RAMP FOR A WHEELCHAIR

(71) Applicants: Garrett J. Smith, Chicago, IL (US);
Darren K. Back, Greencastle, IN (US);
Stephen A. Asztalos, Angola, IN (US);
Judson Smith, Greencastle, IN (US)

(72) Inventors: Garrett J. Smith, Chicago, IL (US);
Darren K. Back, Greencastle, IN (US);
Stephen A. Asztalos, Angola, IN (US);
Judson Smith, Greencastle, IN (US)

(73) Assignee: Dallas Smith Corporation, Greencastle, IN (US)

( * ) Notice: Subject to any disclaimer, the term of this patent is extended or adjusted under 35 U.S.C. 154(b) by 0 days.

(21) Appl. No.: 14/089,053

(22) Filed: Nov. 25, 2013

(65) Prior Publication Data

US 2014/0219756 A1 Aug. 7, 2014

Related U.S. Application Data

(60) Provisional application No. 61/762,064, filed on Feb. 7, 2013, provisional application No. 61/783,637, filed on Mar. 14, 2013.

(51) Int. Cl.
*B60P 1/00* (2006.01)
*A61G 3/06* (2006.01)
*B60P 1/43* (2006.01)

(52) U.S. Cl.
CPC .......... *A61G 3/061* (2013.01); *A61G 2003/067* (2013.01); *B60G 2400/0511* (2013.01); *B60P 1/43* (2013.01)

(58) Field of Classification Search
CPC ............... B60G 2500/201; B60G 2400/0511; B60G 2202/152; B60G 17/017; B60P 1/43; A61G 3/061

USPC ............ 414/537, 334, 336, 812; 14/71.1; 105/436; 701/36, 37, 38, 49; 280/5.24, 280/5.506, 5.513, 5.514, 6.15, 6.152, 6.153, 280/6.154, 6.151, 6.155; 296/61

See application file for complete search history.

(56) References Cited

U.S. PATENT DOCUMENTS

| 3,836,161 | A | | 9/1974 | Buhl | |
| 3,846,860 | A | * | 11/1974 | Kummerman | ................. 14/71.1 |
| 3,917,307 | A | | 11/1975 | Shoebridge | |
| 4,641,843 | A | | 2/1987 | Morrisroe | |
| 4,697,822 | A | | 10/1987 | Blanz | |
| 4,718,683 | A | | 1/1988 | Perga | |

(Continued)

FOREIGN PATENT DOCUMENTS

| AU | 199467696 | 4/1995 |
| AU | 687066 C1 | 9/1999 |

(Continued)

*Primary Examiner* — Saul Rodriguez
*Assistant Examiner* — Glenn Myers
(74) *Attorney, Agent, or Firm* — John V. Daniluck; Bingham Greenebaum Doll LLP

(57) ABSTRACT

An apparatus for providing wheelchair access to a vehicle, including a deployable wheelchair access assembly coupled to the vehicle and deployable to a position in which one end of the assembly is in contact with the ground. The wheelchair access assembly can include multiple panels. Some embodiments include a control system for adjusting the angular relationship of one panel relative to another panel. Yet other embodiments include a sensor for measuring the inclination of the deployed assembly relative to earth's gravity. In yet other embodiments the vehicle includes a sensor for measuring the inclination of the vehicle relative to earth's gravity, and a plurality of suspension actuators for changing the inclination of the vehicle.

16 Claims, 23 Drawing Sheets

(56) References Cited

U.S. PATENT DOCUMENTS

| | | | |
|---|---|---|---|
| 4,746,133 | A | 5/1988 | Hanser et al. |
| 4,822,063 | A | 4/1989 | Yopp et al. |
| 4,838,574 | A | 6/1989 | Baraszu |
| 5,143,386 | A | 9/1992 | Uriarte |
| 5,158,419 | A | 10/1992 | Aoki |
| 5,159,989 | A | 11/1992 | Claxton |
| 5,161,579 | A | 11/1992 | Anderson, Jr. |
| 5,165,839 | A | 11/1992 | Aoki |
| 5,180,275 | A | 1/1993 | Crawford et al. |
| 5,188,379 | A | 2/1993 | Krause et al. |
| 5,193,849 | A | 3/1993 | Holzmann |
| 5,208,749 | A * | 5/1993 | Adachi et al. .................. 701/38 |
| 5,228,538 | A | 7/1993 | Tremblay |
| 5,228,704 | A | 7/1993 | Tabe |
| 5,229,829 | A | 7/1993 | Nakao et al. |
| 5,234,311 | A | 8/1993 | Jewett et al. |
| 5,261,779 | A | 11/1993 | Goodrich |
| 5,299,904 | A | 4/1994 | Kempf |
| 5,312,119 | A | 5/1994 | Jacobs et al. |
| 5,322,321 | A | 6/1994 | Yopp |
| 5,344,189 | A | 9/1994 | Shima et al. |
| 5,433,580 | A | 7/1995 | Kempf |
| 5,465,209 | A | 11/1995 | Georgin et al. |
| 5,499,845 | A | 3/1996 | Geiger |
| 5,517,847 | A | 5/1996 | Campbell et al. |
| 5,560,591 | A | 10/1996 | Trudeau et al. |
| 5,632,593 | A | 5/1997 | Schafer et al. |
| 5,652,703 | A | 7/1997 | Kawazoe |
| 5,707,045 | A | 1/1998 | Easter |
| 5,803,615 | A | 9/1998 | Cohn |
| 5,826,889 | A | 10/1998 | Eden |
| 5,860,450 | A | 1/1999 | Schafer et al. |
| 5,865,593 | A | 2/1999 | Cohn |
| 5,915,700 | A | 6/1999 | Jacobs et al. |
| 5,944,473 | A | 8/1999 | Saucier et al. |
| 5,988,654 | A | 11/1999 | Wix et al. |
| 6,007,073 | A | 12/1999 | Gunter |
| 6,042,327 | A | 3/2000 | DeLeo et al. |
| 6,043,741 | A | 3/2000 | Whitmarsh |
| 6,050,573 | A * | 4/2000 | Kunz ...................... 280/6.153 |
| 6,062,805 | A | 5/2000 | Reynolds et al. |
| 6,077,025 | A | 6/2000 | Budd et al. |
| 6,082,743 | A | 7/2000 | Black |
| 6,086,314 | A | 7/2000 | Savaria |
| 6,095,747 | A | 8/2000 | Cohn |
| 6,098,967 | A | 8/2000 | Folchert |
| 6,098,995 | A | 8/2000 | Danis |
| 6,098,996 | A | 8/2000 | Perlot |
| 6,116,586 | A | 9/2000 | Folchert et al. |
| 6,173,810 | B1 | 1/2001 | Citron et al. |
| 6,173,974 | B1 | 1/2001 | Raad et al. |
| 6,176,495 | B1 | 1/2001 | Decker |
| 6,179,545 | B1 * | 1/2001 | Petersen et al. ................ 414/537 |
| 6,224,044 | B1 | 5/2001 | Heilenkotter |
| 6,234,493 | B1 | 5/2001 | Kleen et al. |
| 6,236,905 | B1 | 5/2001 | Whitmarsh |
| 6,264,213 | B1 | 7/2001 | Kutscher |
| 6,305,897 | B1 | 10/2001 | Budd et al. |
| 6,332,623 | B1 | 12/2001 | Behmenburg et al. |
| 6,343,908 | B1 * | 2/2002 | Oudsten et al. ................ 414/537 |
| 6,352,396 | B1 | 3/2002 | Budd et al. |
| 6,357,992 | B1 | 3/2002 | Ringdahl |
| 6,398,479 | B1 | 6/2002 | Dupuy et al. |
| 6,425,604 | B1 | 7/2002 | Eckert et al. |
| 6,471,196 | B2 | 10/2002 | Stiller |
| 6,491,307 | B1 | 12/2002 | Charzinski et al. |
| 6,566,864 | B1 | 5/2003 | Brown et al. |
| 6,584,385 | B1 | 6/2003 | Ford et al. |
| 6,585,474 | B1 | 7/2003 | Kameda |
| 6,599,079 | B1 | 7/2003 | Hermanson et al. |
| 6,602,041 | B2 | 8/2003 | Lewis et al. |
| 6,684,138 | B1 | 1/2004 | Friede et al. |
| 6,729,829 | B2 | 5/2004 | Zimmer |
| 6,848,693 | B2 | 2/2005 | Schneider |
| 6,860,701 | B2 | 3/2005 | Kiser |
| 6,885,924 | B2 | 4/2005 | Ford et al. |
| 6,948,722 | B2 * | 9/2005 | Sproatt et al. .............. 280/6.153 |
| 6,971,834 | B2 | 12/2005 | Morris |
| 6,983,953 | B1 | 1/2006 | Damron |
| 7,000,927 | B2 | 2/2006 | Bell |
| 7,104,548 | B2 | 9/2006 | Ichimura et al. |
| 7,168,370 | B2 | 1/2007 | Hommen et al. |
| 7,185,592 | B2 | 3/2007 | Hommen et al. |
| 7,192,032 | B2 * | 3/2007 | Dodd et al. ................. 280/5.508 |
| 7,208,943 | B2 | 4/2007 | Godoy et al. |
| 7,226,057 | B2 * | 6/2007 | Eichhorn et al. ........... 280/6.153 |
| 7,243,606 | B2 | 7/2007 | Hommen et al. |
| 7,306,422 | B2 | 12/2007 | Dupuy et al. |
| 7,326,024 | B2 | 2/2008 | Cohn |
| 7,370,853 | B2 | 5/2008 | Urquidi et al. |
| 7,384,232 | B2 | 6/2008 | Morris |
| 7,389,994 | B2 * | 6/2008 | Trudeau et al. ............ 280/6.153 |
| 7,417,395 | B2 | 8/2008 | Edwards et al. |
| 7,419,349 | B2 | 9/2008 | Goodrich |
| 7,429,050 | B2 | 9/2008 | Amano |
| 7,441,782 | B2 | 10/2008 | Stiller |
| 7,445,416 | B2 | 11/2008 | O'Leary et al. |
| 7,500,818 | B1 | 3/2009 | Johnson |
| 7,509,187 | B2 * | 3/2009 | Hayes et al. ................... 700/213 |
| 7,551,995 | B2 | 6/2009 | Heigl et al. |
| 7,617,018 | B2 | 11/2009 | Ford et al. |
| 7,624,995 | B2 | 12/2009 | Barbison |
| 7,735,839 | B1 | 6/2010 | Schlangen |
| 7,744,099 | B2 | 6/2010 | Holbrook |
| 7,761,258 | B2 | 7/2010 | Brown |
| 7,786,883 | B1 | 8/2010 | Davison |
| 7,798,761 | B2 | 9/2010 | Goodrich et al. |
| 7,815,413 | B2 | 10/2010 | Fisher et al. |
| 7,837,203 | B1 | 11/2010 | Schmidt et al. |
| 7,870,631 | B2 | 1/2011 | Morris et al. |
| 7,926,600 | B2 | 4/2011 | Flynn et al. |
| 7,942,432 | B2 | 5/2011 | Beilman, III |
| 8,032,963 | B2 | 10/2011 | Morris et al. |
| 8,155,435 | B2 | 4/2012 | Sakashita |
| 8,375,496 | B1 * | 2/2013 | Johnson et al. ................. 14/71.3 |
| 8,413,997 | B1 | 4/2013 | Coombs et al. |
| 8,505,141 | B1 * | 8/2013 | Morris et al. .................. 14/71.3 |
| 8,534,979 | B2 * | 9/2013 | Hansen ........................ 414/537 |
| 2001/0005478 | A1 | 6/2001 | Lewis et al. |
| 2001/0017449 | A1 | 8/2001 | Stiller |
| 2001/0049908 | A1 | 12/2001 | Cohn et al. |
| 2002/0079626 | A1 | 6/2002 | Grotendorst et al. |
| 2002/0096840 | A1 | 7/2002 | Blanz et al. |
| 2003/0193149 | A1 | 10/2003 | Foster et al. |
| 2004/0028513 | A1 | 2/2004 | Reynolds |
| 2004/0049330 | A1 * | 3/2004 | Fiorletta et al. ................. 701/37 |
| 2005/0077111 | A1 | 4/2005 | Sobota et al. |
| 2005/0238472 | A1 | 10/2005 | Sobota et al. |
| 2006/0051191 | A1 | 3/2006 | Dupuy et al. |
| 2006/0104773 | A1 | 5/2006 | Koretsky et al. |
| 2007/0282498 | A1 | 12/2007 | Holbrook et al. |
| 2008/0184500 | A1 | 8/2008 | Bettcher |
| 2009/0035112 | A1 * | 2/2009 | Morris et al. .................. 414/537 |
| 2011/0008140 | A1 * | 1/2011 | Hansen et al. ................. 414/523 |
| 2011/0031040 | A1 | 2/2011 | Deleo et al. |
| 2011/0035104 | A1 | 2/2011 | Smith |
| 2011/0042164 | A1 | 2/2011 | Clark et al. |
| 2012/0043735 | A1 | 2/2012 | Grauer et al. |

FOREIGN PATENT DOCUMENTS

| | | |
|---|---|---|
| AU | 1999025008 A1 | 11/1999 |
| AU | 749303 B2 | 6/2002 |
| AU | 2006100956 A5 | 11/2006 |
| AU | 2006100956 B4 | 3/2007 |
| AU | 2003202922 B2 | 9/2007 |
| CA | 2226156 C | 7/2001 |
| CA | 2630373 A1 | 11/2009 |
| DE | 19539887 A1 | 4/1997 |
| EP | 666190 A1 | 8/1995 |
| EP | 1380454 A1 | 5/2003 |
| EP | 1380454 B1 | 12/2007 |
| EP | 2003000 | 12/2008 |
| EP | 1650061 B1 | 5/2010 |

(56) References Cited

FOREIGN PATENT DOCUMENTS

| | | |
|---|---|---|
| EP | 2343223 A2 | 7/2011 |
| GB | 2322353 A | 8/1998 |
| WO | 9746199 A1 | 12/1997 |
| WO | 02064407 A1 | 8/2002 |
| WO | 03104133 A2 | 12/2003 |
| WO | 2005039018 A2 | 4/2005 |
| WO | 2005042198 A2 | 5/2005 |
| WO | 2005053178 A1 | 6/2005 |
| WO | 2005042302 A3 | 10/2005 |
| WO | 2005037593 A3 | 12/2005 |
| WO | 2005010719 A3 | 6/2006 |
| WO | 2005077102 A2 | 4/2009 |
| WO | 2005077102 A3 | 4/2009 |
| WO | 2013142280 A1 | 9/2013 |

* cited by examiner

LEVELING RAMP FOR A WHEELCHAIR

CROSS REFERENCE TO RELATED APPLICATION

This application claims the benefit of priority to U.S. Provisional Patent Application Ser. No. 61/762,064, filed Feb. 7, 2013, and U.S. Provisional Patent Application Ser. No. 61/783,637, filed Mar. 14, 2013, both of which are incorporated herein by reference.

FIELD OF THE INVENTION

Various embodiments of the present invention pertain to apparatus and method for altering the position of an articulating panel, and in some embodiments to varying the deployed configuration of a wheelchair ramp.

SUMMARY OF THE INVENTION

One aspect of the present invention pertains to an apparatus for providing wheelchair access. Some embodiments include a support frame. Other embodiments include three substantially flat panels hinged together along a single axis. Yet other embodiments include an actuator having a first member movable relative to a second member, with one of the first member or second member being coupled to the support frame and the other of the first member or the second member being coupled to one of the panels; and a sensor for sensing the relative position of the frame relative to the one panel.

Another aspect of the present invention pertains to a multiwheeled ground vehicle. Some embodiments include a frame. Other embodiments include four wheels each supporting the frame from the ground by a suspension system, each suspension system including a spring in at least a portion of the load path from the corresponding wheel to the frame. Other embodiments include a sensor providing an electronic signal responsive to the inclination of the frame, a deployable wheelchair assembly attached to the frame, the assembly being deployable from a stowed position within the vehicle to a deployed position extending out of the vehicle and in contact with the ground; and a controller receiving the signal and operable connected to the assembly for control of the assembly between the stowed position and the deployed position.

Still another aspect of the present invention pertains to a method for deploying a wheelchair access assembly from a ground vehicle. Some embodiments include providing a deployable wheelchair assembly coupled to a frame, and deployable from a stowed position within the vehicle to a deployed position extending out of the vehicle, an electronic sensor providing a signal, a suspension system actuatable to change the inclination of the vehicle. Other embodiments include sensing with the sensor the inclination of the frame relative to the ground. Yet other embodiments include commanding the assembly to deploy, actuating the suspension system to change the inclination of the frame; and using the signal and moving the frame to a more level inclination.

Yet another aspect of the present invention pertains to a kit for retrofitting a transit bus. Some embodiments include a frame. Other embodiments include a structural member hinged to the frame and pivotal relative to the frame. Yet other embodiments include an actuator attached to the member and actuatable for pivoting the member relative to the frame. Still other embodiments include a multisection folding wheelchair ramp, the ramp being attached to the member; and an electronic sensor providing a signal corresponding to the position of a section of the ramp.

Yet another aspect of the present invention pertains to an apparatus. Some embodiments include a transit bus having a frame. Other embodiments include a multisection deployable wheelchair ramp pivotally coupled to the frame, the fully deployed sections of the ramp capable of being used for wheelchair ingress and egress over a plurality of angular relationships. Other embodiments include means for deploying the ramp from the vehicle; and means for pivoting one section of the ramp relative to another section of the ramp over a range of angular relationships.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions. Further, some of the figures shown herein may have been created from scaled drawings or from photographs that are scalable. It is understood that such dimensions, or the relative scaling within a figure, are by way of example, and not to be construed as limiting.

ELEMENT NUMBERING

Figure 1:
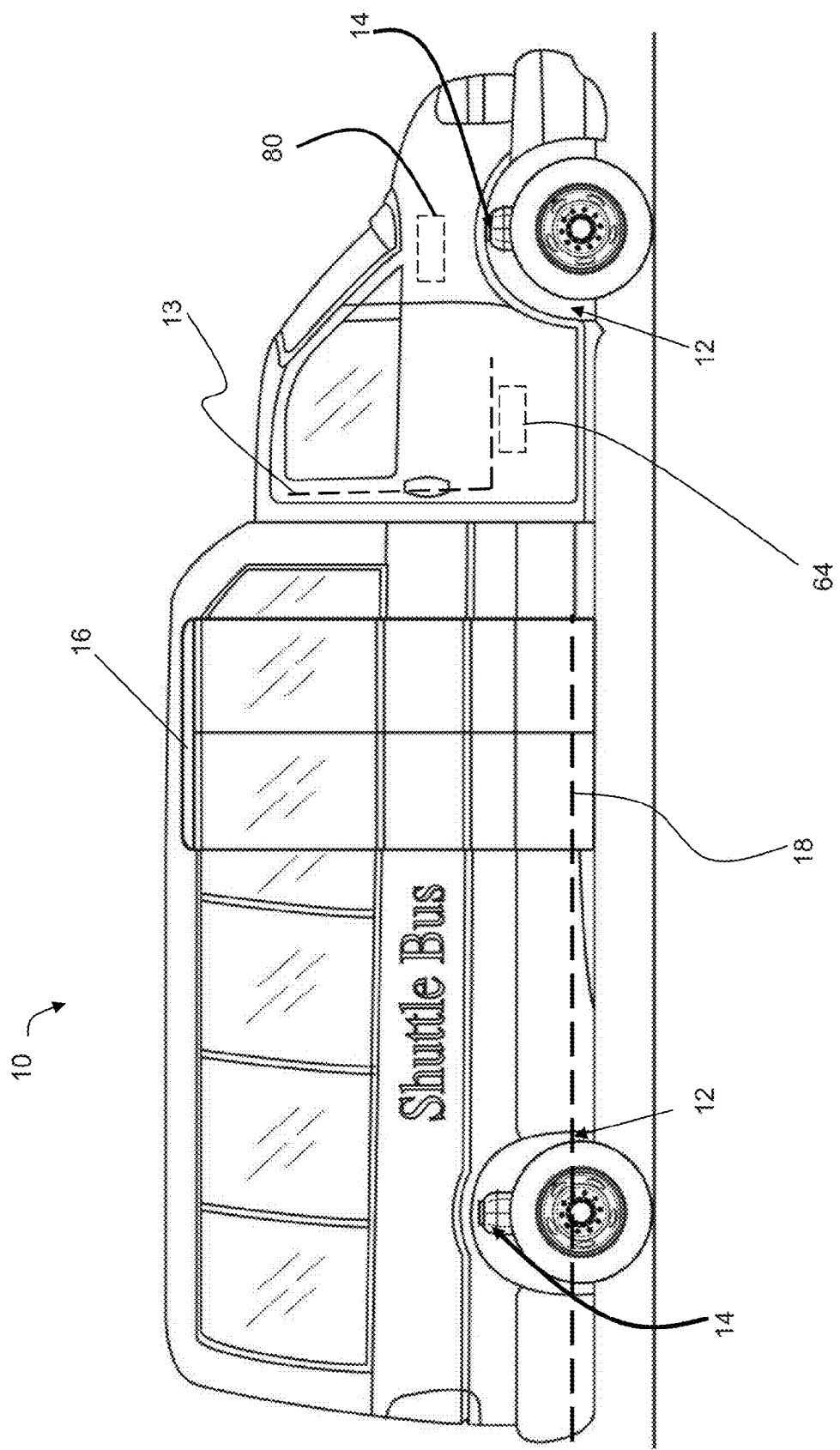
FIG. 1 is a right side elevational view of a transit bus according to one embodiment of the present invention.

The following is a list of element numbers and at least one word used to describe that element. It is understood that none of the embodiments disclosed herein are limited to these words, and these element numbers can further pertain to other words that would be understood by a person of ordinary skill reading and reviewing this disclosure in its entirety.

| | |
|---|---|
| 7 | outside surface |
| 10 | transit bus |
| 12 | suspension |
| 13 | driver's seat |
| 14 | air spring |
| 16 | side door |
| 18 | frame |
| a | longitudinal member, main |
| b | lateral member |
| c | longitudinal member, outer |
| d | cutout |
| e | hinge support member |
| 20 | ramp assembly |
| 21 | first panel |
| 22 | second panel |
| 23 | third panel |
| 24 | ramp actuation assy. |
| 26 | panel hinge, frame |
| 27 | panel-panel hinges |
| 28 | panel coupling linkage |
| 29 | chain |
| 30 | ramp static support |
| 31 | side brace |
| 32 | tray |
| 33 | actuator - frame bracket |
| 34 | actuator - bedplate bracket |
| 35 | hinge support |
| 36 | cross member |
| 40 | ramp support plate |
| 42 | bed plate |
| 43 | side clamp |
| 50 | actuation system |
| 52 | actuator |
| .1 | ball screw actuator |
| .2 | motor |
| 54 | gas struts |
| 56 | coupling link |
| 60 | angular position sensor |
| 62 | ramp inclination sensor |
| 64 | vehicle inclination sensor |

-continued

| | |
|---|---|
| 66 | driver annunciators |
| 68 | passenger annunciators |
| 80 | electronic controller |
| 82 | memory |
| 84 | software |
| 90 | vehicle algorithm |
| 92 | deployment algorithm |

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims. The usage of words indicating preference, such as "preferably," refers to features and aspects that are present in at least one embodiment, but which are optional for some embodiments.

The use of an N-series prefix for an element number (NXX.XX) refers to an element that is the same as the non-prefixed element (XX.XX), except as shown and described thereafter. As an example, an element 1020.1 would be the same as element 20.1, except for those different features of element 1020.1 shown and described. Further, common elements and common features of related elements are drawn in the same manner in different figures, and/or use the same symbology in different figures. As such, it is not necessary to describe the features of 1020.1 and 20.1 that are the same, since these common features are apparent to a person of ordinary skill in the related field of technology. This description convention also applies to the use of prime ('), double prime ("), and triple prime ('") suffixed element numbers. Therefore, it is not necessary to describe the features of 20.1, 20.1', 20.1", and 20.1'" that are the same, since these common features are apparent to persons of ordinary skill in the related field of technology.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

What will be shown and described herein, along with various embodiments of the present invention, is discussion of one or more tests that were performed. It is understood that such examples are by way of examples only, and are not to be construed as being limitations on any embodiment of the present invention. It is understood that embodiments of the present invention are not necessarily limited to or described by the mathematical analysis presented herein.

Various references may be made to one or more processes, algorithms, operational methods, or logic, accompanied by a diagram showing such organized in a particular sequence. It is understood that the order of such a sequence is by example only, and is not intended to be limiting on any embodiment of the invention.

Figure 2:
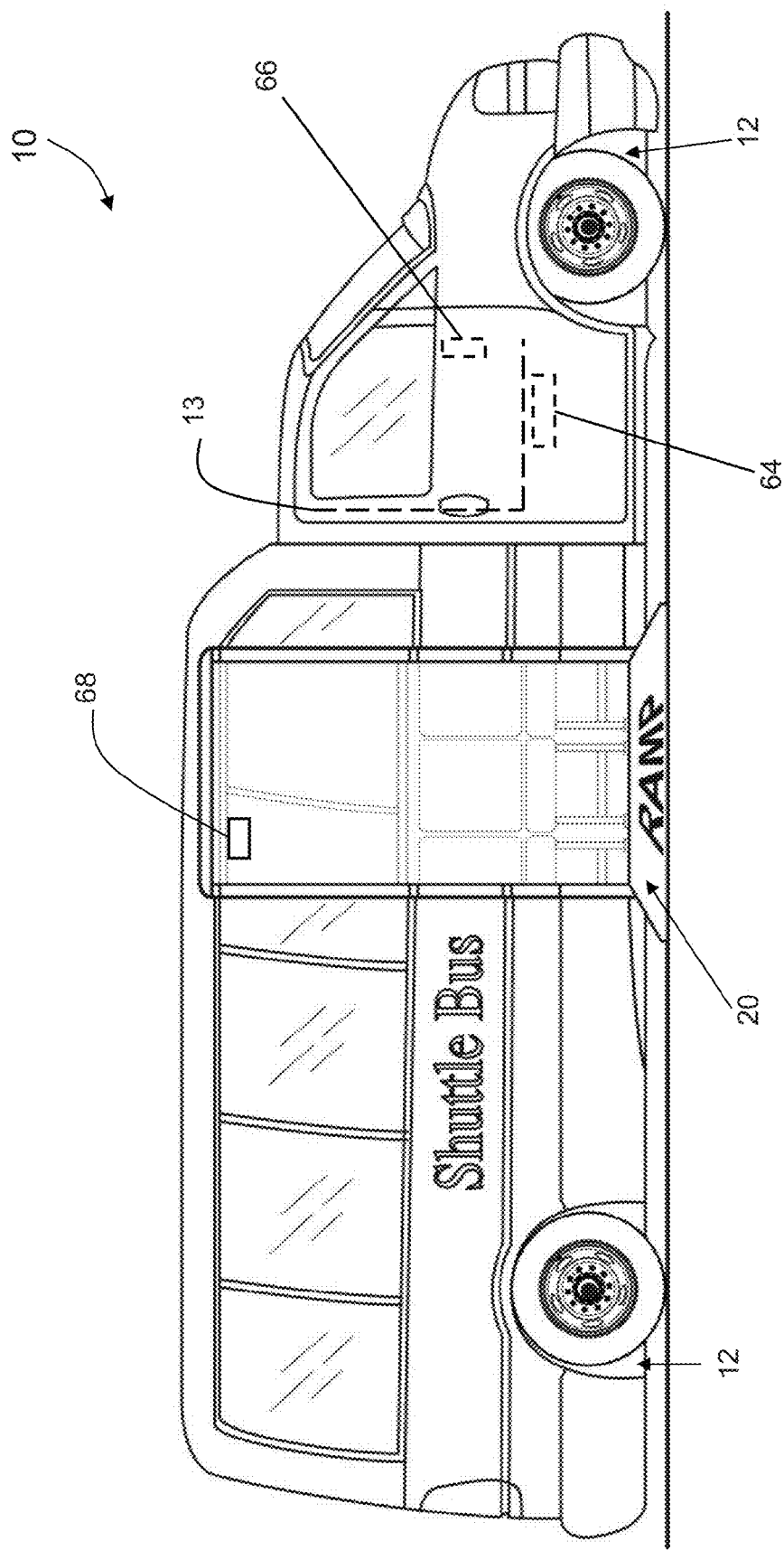
FIG. 2 is a right side elevational view of the bus of FIG. 1 shown with the side door open and the wheel chair ramp deployed.

FIGS. 1 and 2 show side views of a transit bus 10 according to one embodiment of the present invention. Bus 10 includes a frame 18 that supports a cab for a driver on a driver's seat 13 and a passenger compartment behind the cab having a right side door 16. In some embodiments, bus 10 is fabricated from a cab, drive train, suspension system, and frame from an existing OEM truck family, which is then modified to accept the passenger compartment for operation of transit bus. However, in yet other embodiments bus 10 is of any type, including purpose-built buses (such as school buses), vans, or any other type of vehicle.

In one preferred embodiment, bus 10 includes a suspension system 12 in which the cab and passenger compartment are supported by air springs 14. Bus 10 includes an electronic controller 80 that operates a pneumatic system for selectively inflating or deflating any one of the four air springs 14. In FIG. 1, bus 10 is shown at a predetermined ride height suitable for transporting passengers over a roadway. In FIG. 2, bus 10 is seen in a kneeling position of predetermined inclination, such that all four air springs 14 have been deflated to achieve a minimum distance between the internal floor of the passenger compartment and the roadway.

FIG. 2 shows side door 16 of bus 10 in the opened position, with a wheelchair ramp 20 extended outwardly, in preparation for ingress or egress of passengers. Although what follows will include discussion that includes a particular type of wheelchair ramp 20, it is understood that the apparatus and methods for providing a relatively straight wheelchair ramp, and also a wheelchair ramp at a particular range of inclinations, can be accomplished with any type of wheelchair-assisting device, including both ramps and lifts, having various numbers of articulating sections.

Figure 3:
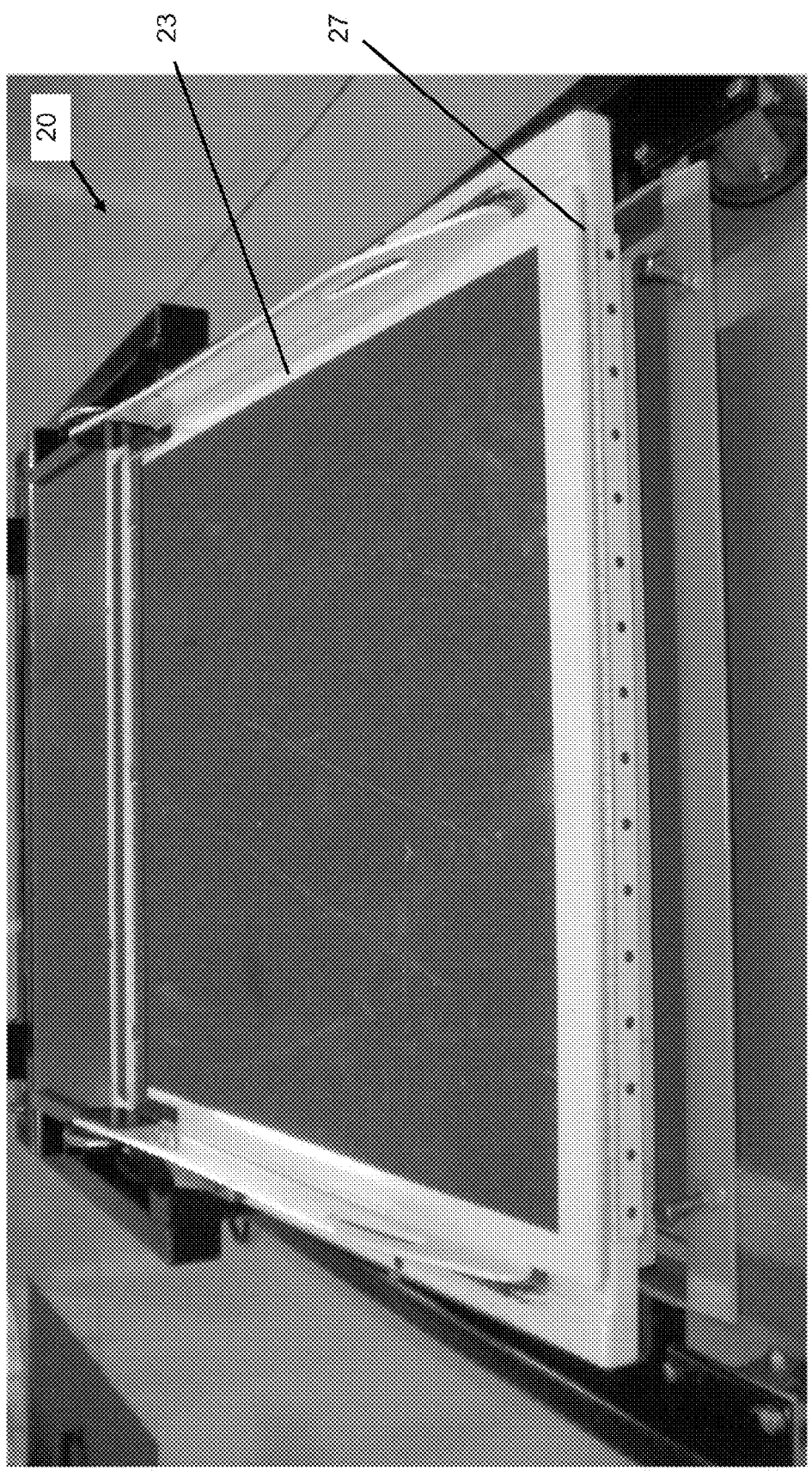
FIG. 3 is a left side, top (consistent with the convention of FIGS. 1 and 2) photographic representation of a wheelchair ramp apparatus according to one embodiment of the present invention, it being understood that the ramp is shown attached to a fixture instead of a vehicle.
Figure 4:
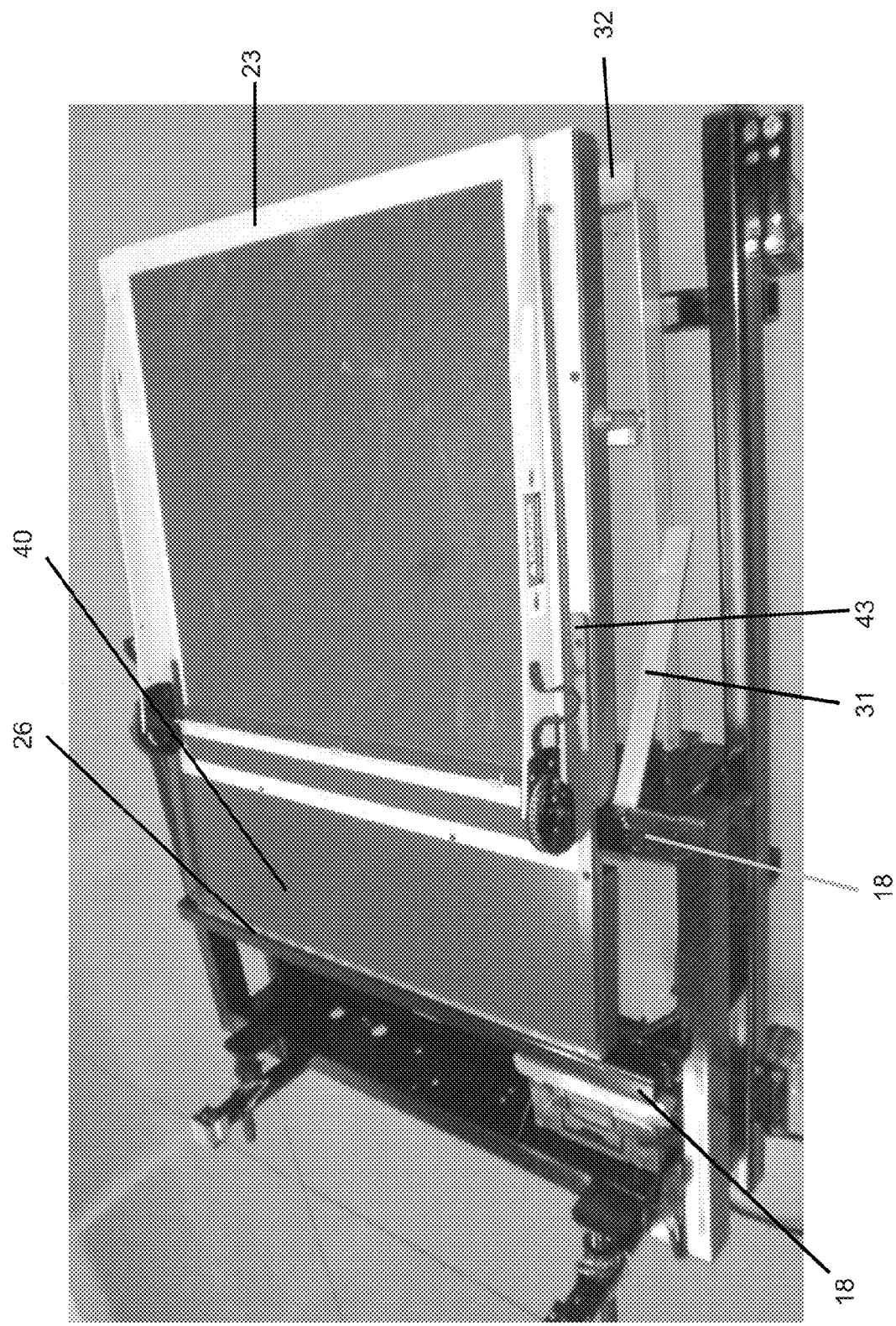
FIG. 4 is a photograph looking downward of the wheelchair ramp and fixture of FIG. 3, as viewed from the right side of the ramp with reference to a person egressing from the vehicle.

FIGS. 3 and 4 show a wheelchair assembly 20 according to one embodiment of the present invention. It should be noted that the assembly shown in FIGS. 3-15 is attached to a fixture that simulates the interface of assembly 20 with a transit bus 10. Various aspects of the mounting fixture shown in FIGS. 3 and 4 represent interfaces with frame 18 of transit bus 10.

Assembly 20 includes an OEM wheelchair ramp assembly that is adapted and configured to mount to the frame of a vehicle. In one embodiment, the invention includes a kit having a plurality of support members, an actuation system, sensors, a controller, and software that can readily be adapted to interface with existing wheelchair ramps and wheelchair lifts. However, a single configuration of a wheelchair ramp will be shown and described, along with the interfacing kit that adapts the OEM ramp to a transit bus 10. It is understood that with adaptations to the kit, many different types of ramps and lifts can be accommodated and attached to a vehicle.

Ramp assembly 20 is shown attached to a frame member 18 by way of a ramp support plate 40. Support plate 40 includes a bed plate 42 that is connected by way of hinge 26 to a frame member 18. A panel 21 of the wheelchair ramp is coupled to bed plate 42 by way of a pair of side clamps 43 that extend laterally outward along the edges of panel 21. In some embodiments, support plate 40 is hingedly connected to a frame rail 18 that is proximate to, but preferably inboard of the vehicle centerline. However, in yet other embodiments the hinged connection of plate 40 to frame 18 can occur anywhere along frame 18 that is aligned with a door, including doors for side and rear entrance.

Figure 5:
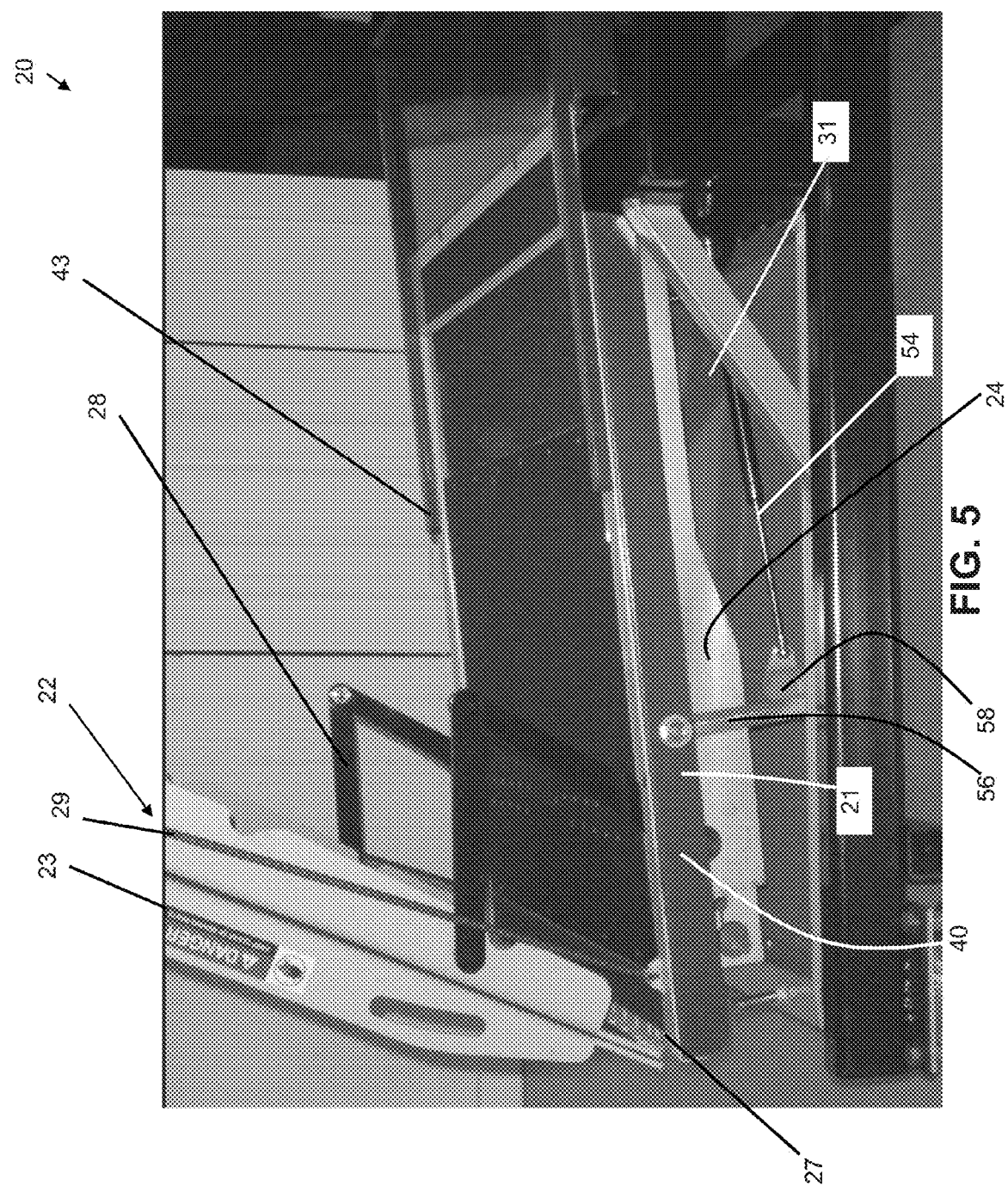
FIG. 5 is a photographic representation of a portion of the ramp apparatus of FIG. 3, as shown from the left side of the ramp for a person egressing the vehicle, and consistent with a view from the front of the vehicle looking aft.
Figure 6:
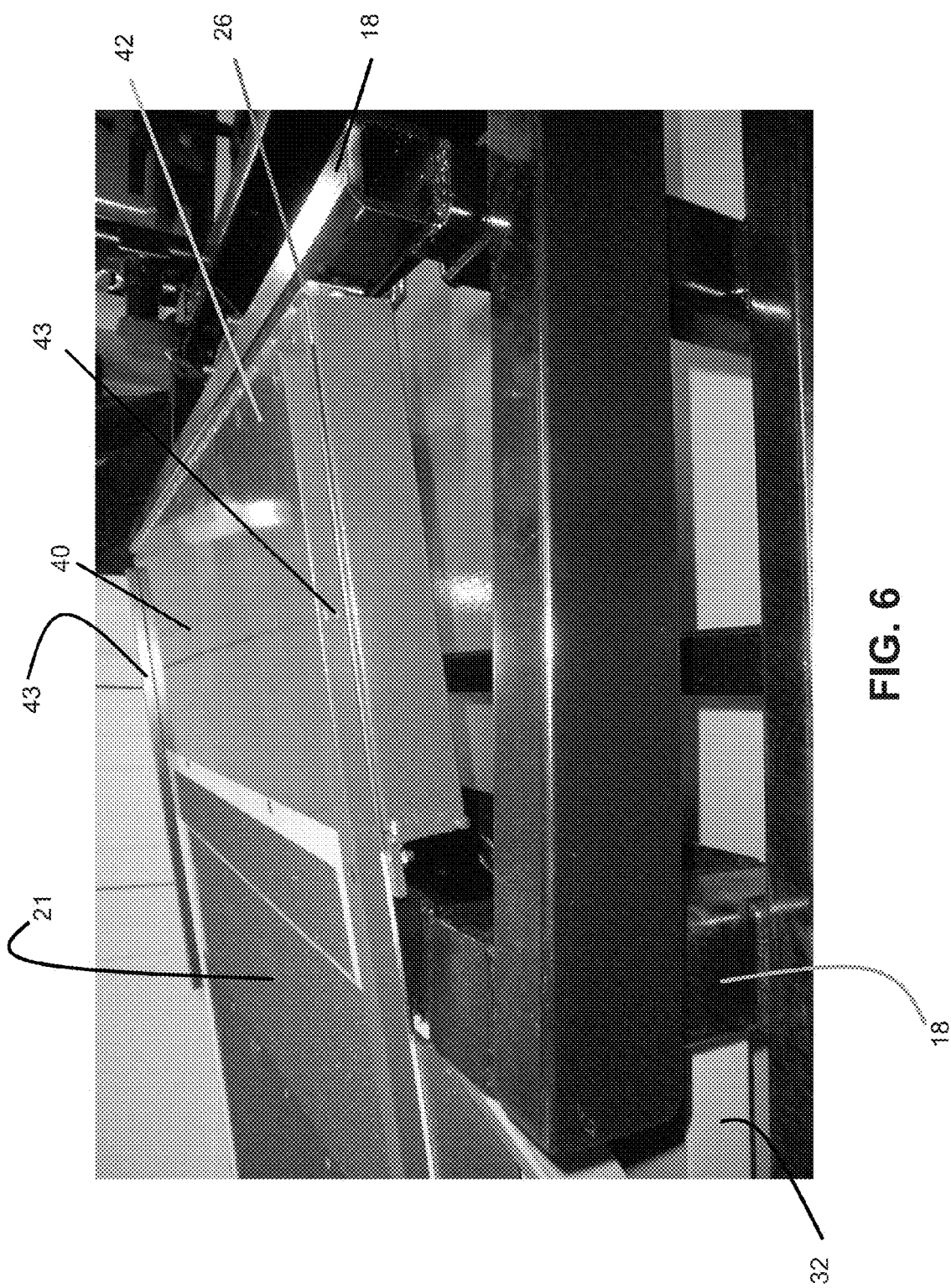
FIG. 6 is a view of the wheelchair ramp unfolding from the stowed position.
Figure 7:
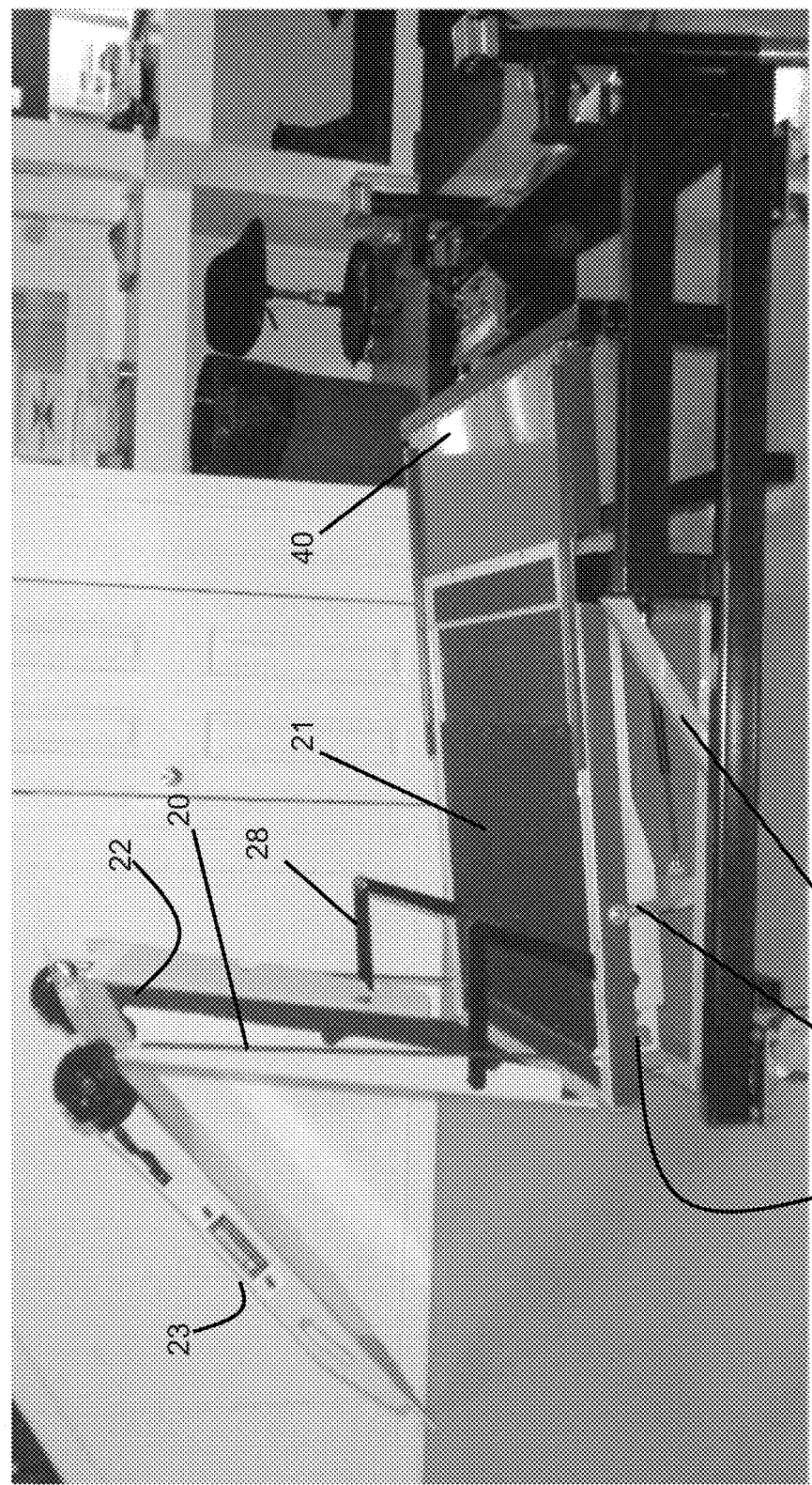
FIG. 7 is a side photographic representation of the wheelchair ramp continuing to unfold.

FIGS. 5, 6, and 7 show the ramp of assembly 20 in various stages of deployment. Referring to FIG. 5, it can be seen that the ramp actuation system 24 (located under panel 21) is driving panel coupling linkage 28 in order to rotate panels 22 and 23 in unison about a hinge joint between panel 22 and panel 21. FIG. 7 shows still further deployment, in which actuation system 24 continues to utilize linkage 28 to rotate panel 22, and further in which actuation system 24 applies tension to chain 20 to rotate panel 23 apart from panel 22.

Figure 8:
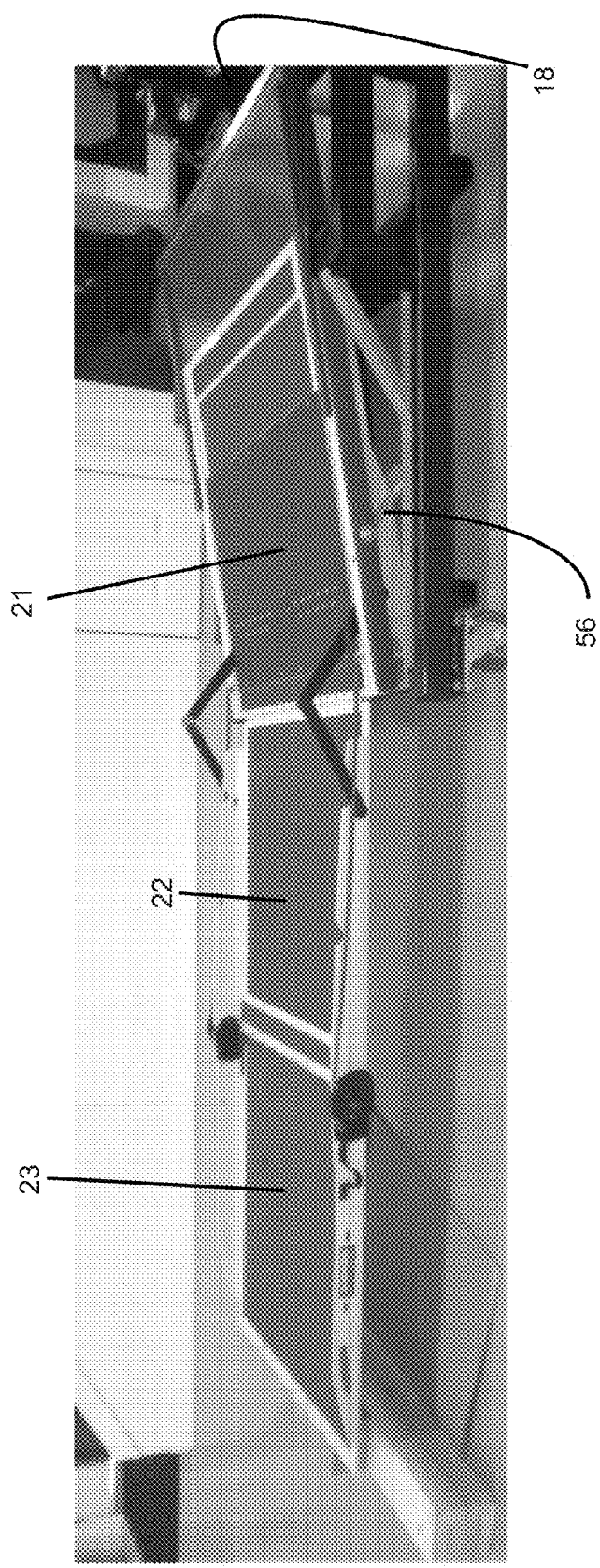
FIG. 8 is a top, side perspective photographic representation of a deployed ramp, oriented as looking aft if it were installed on a vehicle, and prior to the acts that level the ramp.
Figure 9:
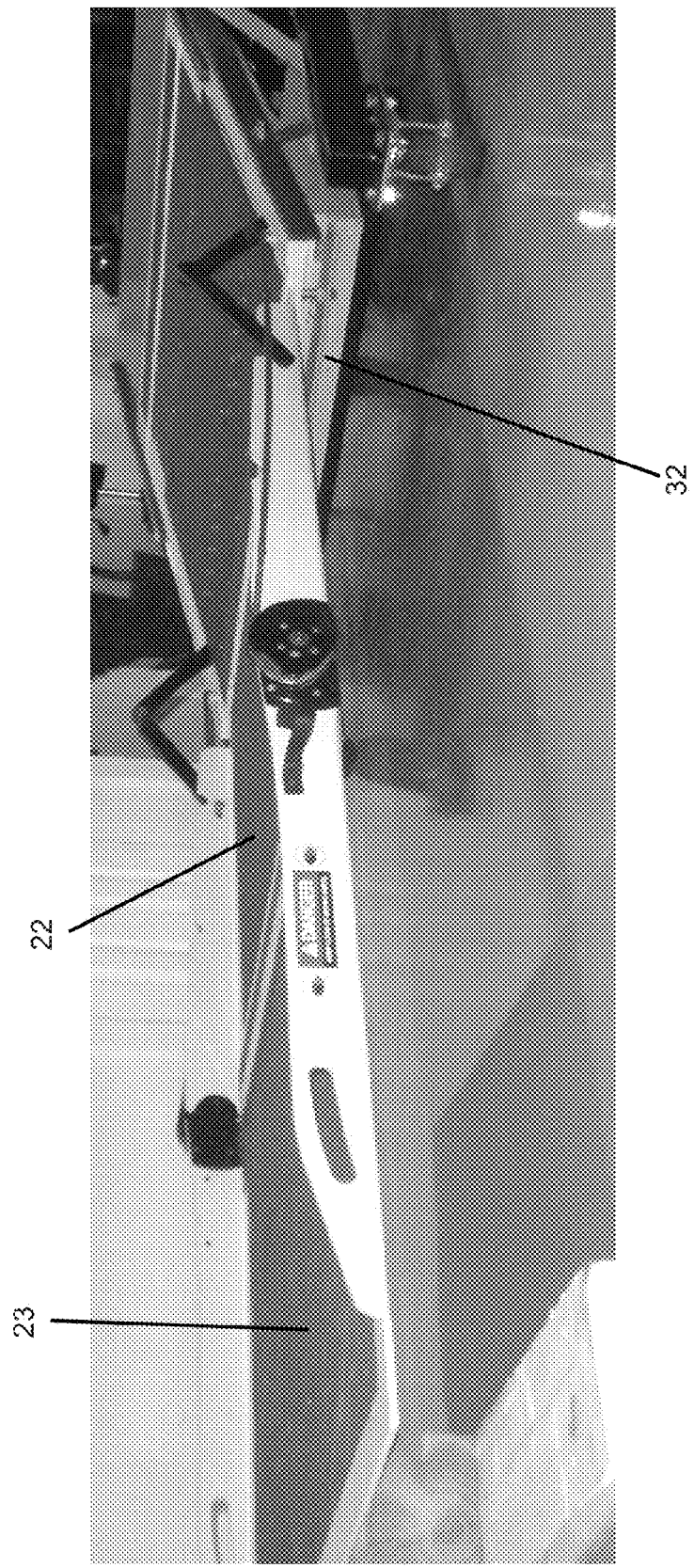
FIG. 9 is a side elevational photographic representation of FIG. 8.

FIGS. 8 and 9 show the panels 21, 22, and 23 in their initially deployed configuration. The outermost edge of panel 23 is supported externally (in FIGS. 8 and 9, by wooden blocks that simulate support of the panel outer edge by a curb, ground, or roadway). It can be seen that the initially deployed panels are not aligned in a substantially flat configuration. Panel 21 and panel 22 form an included angle that is less than 180 degrees. However, because of the characteristics of ramp actuation system 24, panels 22 and 23 are in substantial alignment and substantially flat. Therefore, a person in a wheelchair traversing into the vehicle from the outermost edge of panel 23 would traverse inward at a first angle of entrance that extends across panels 22 and 23, and then move upward at a second, greater angle on panel 21. This change in the inclination of the wheelchair can make movement of the wheelchair difficult for the operator as the front wheels of the wheelchair encounter panel 21.

Still further, it can be seen that the angular relationship between the floor of the passenger compartment (as represented by the top of frame member 18 in FIG. 8) represents yet another angular change, the included angle from the surface of the bus floor to the surface of panel 21 being greater than 180 degrees. In this configuration, a wheelchair entering the passenger compartment could have a front wheel lift off of the compartment floor.

FIGS. 5, 7, 10, 11, and 12 depict portions of a kit of parts that provides an actuatable interface between the bus and the ramp so as to alter the angles of the initially deposed ramp and make entrance and exit from the bus easier to a wheelchair operator.

FIGS. 5 and 7 show portions of a ramp static support assembly 30 that is located beneath panel 21. The support assembly 30 includes a tray 32, the inboard edge of which is attached to frame 18, such as by welding. In some embodiments, a side brace 31 also attaches to frame 18 on one end and on the other end attaches to tray 32. Tray 32 extends laterally outward from the vehicle frame, from a location proximate to panel hinge 40 of bed plate 42, to a location underneath and slightly inward of the outermost end of plate 21 (proximate to the panel hinge 27 that connects adjacent edges of panels 21 and 22).

It is understood that even though a specific configuration of a tray 32 will be shown and described, it is understood that any manner of support can be provided to react the panel level forces that will be shown and described.

Various embodiments of the present invention include an actuation system 50 that can adjust the angular relationship (and also the vertical distance) between plate 21 and tray 32. For those embodiments that include a static support system 30 not having a tray, it is understood that actuation system 50 applies a force to ramp 21 that varies at least one of the following included angles; between panel 21 and 22; or between panel 21 and the floor of the vehicle.

As expressed in the embodiment depicted in FIGS. 3-14 and discussed herein, one manner of adjusting the position of panel 21 is with an actuation system that applies actuation loads reacting between panel 21 and tray 32. However, it is understood that other types of actuation systems are contemplated by the present invention, including various multi-bar linkages, cams, rollers, push-pull actuation systems, chain drives, and the like, for handling the reaction loads used to move the position of panel 21.

Further, it is understood that although reference will be made to adjusting position of panel 21, still further embodiments pertain to adjusting the position of panel 22 or panel 21. Still further, various embodiments pertain to ramp assemblies having fewer than three panels or more than three panels, and further those embodiments in which at least one of the panels is attached to a wheelchair lifting support.

As best seen in FIGS. 5 and 7, actuation system 50 include a coupling link 56 that is pivotally coupled to support plate 40 on one end, pivotally coupled to a gas strut 54, and pivotally coupled to an actuated platform 58. Ramp assembly 20 includes coupling links 56 on each side of assembly 20, and further includes gas struts 54 on each side of assembly 20, the pair of coupling links and pair of gas struts both pivotally coupled to platform 21 and pivotally coupled to an actuated platform 58.

Figure 10:
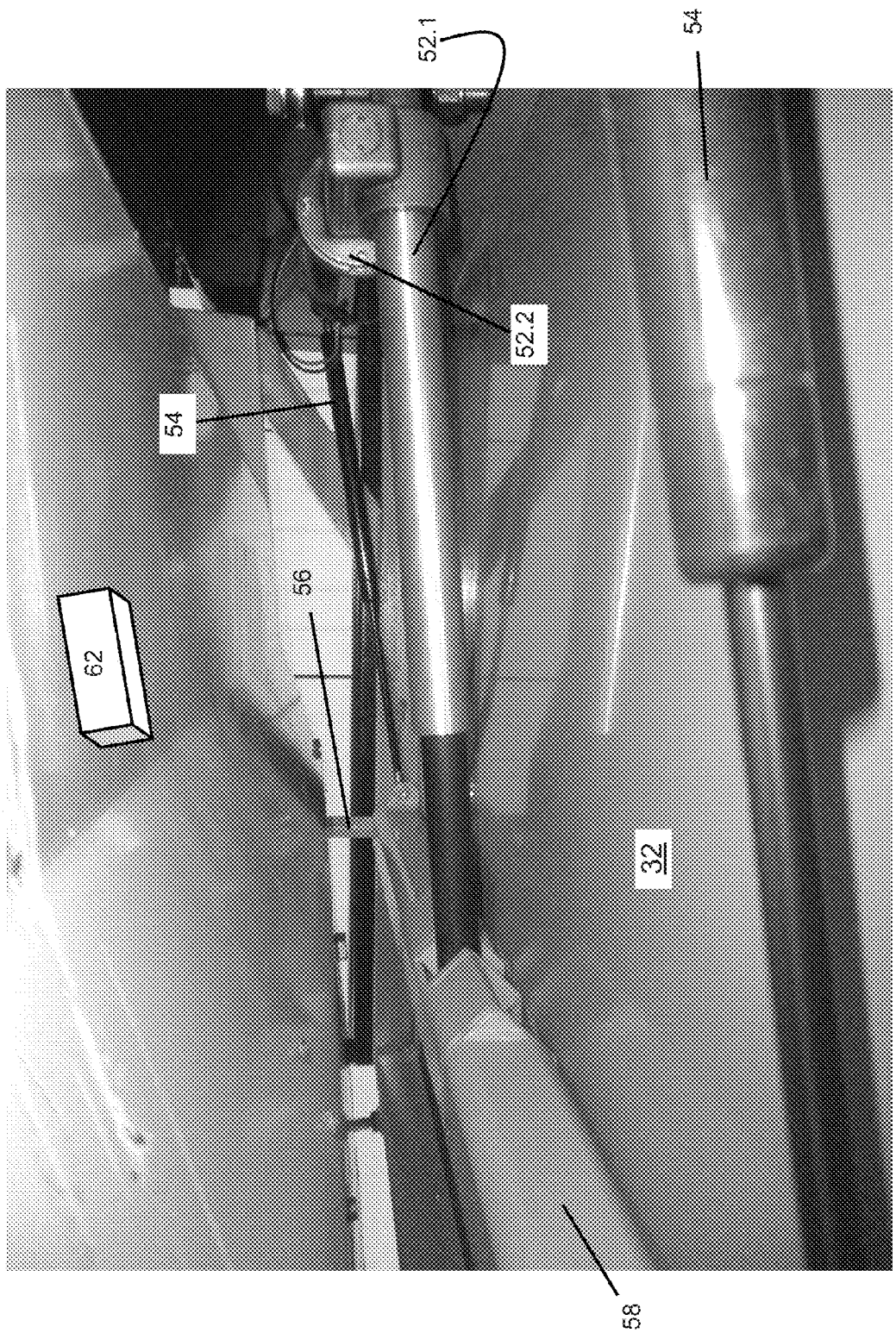
FIG. 10 is a view of the apparatus of the ramp, taken underneath the ramp passenger surface, looking aft (relative to the vehicle) if it were deployed on vehicle.
Figure 11:
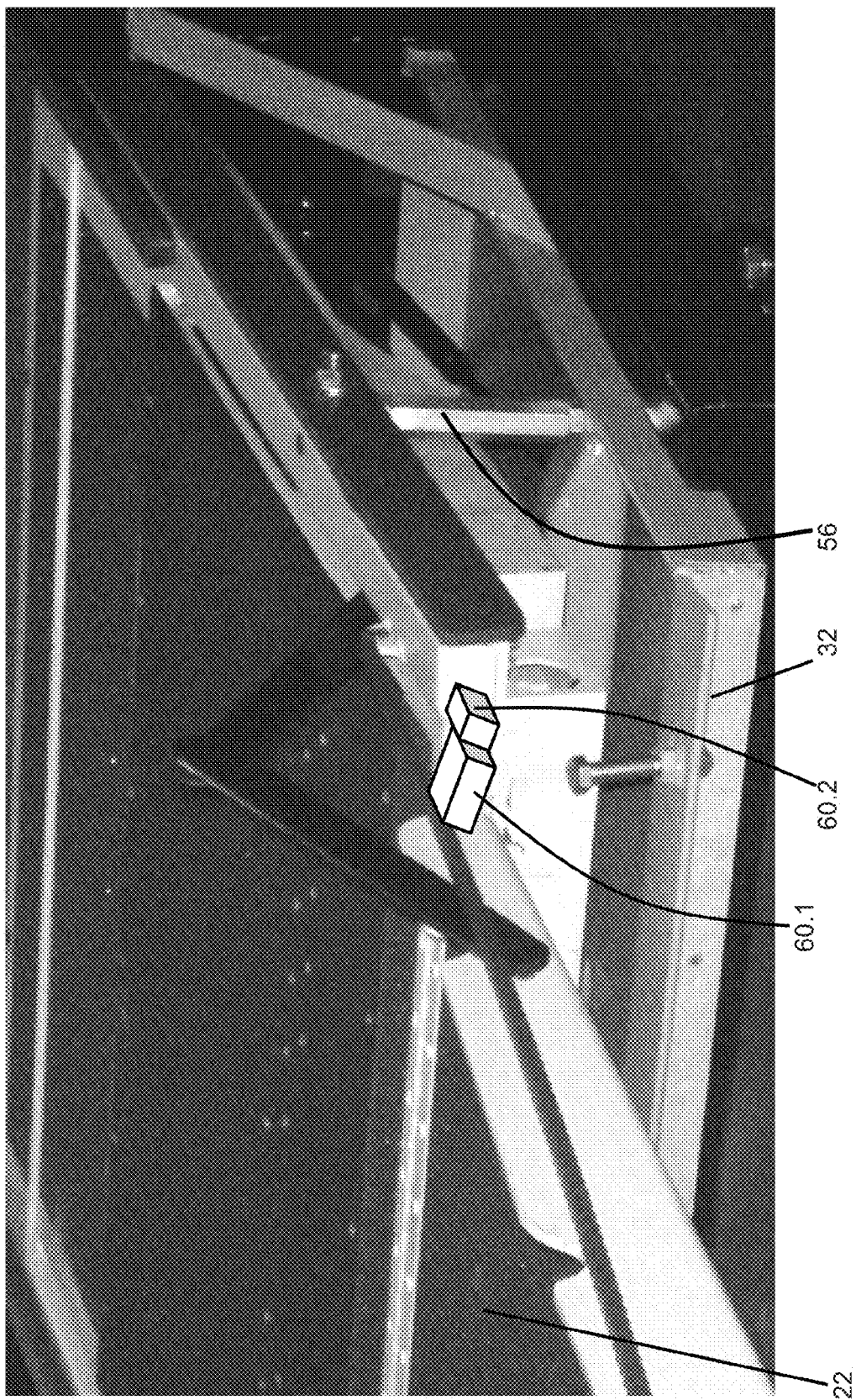
FIG. 11 is a view of the deployed ramp after the leveling acts, taken from the forward side looking inward and aft if it were installed on a vehicle.
Figure 12:
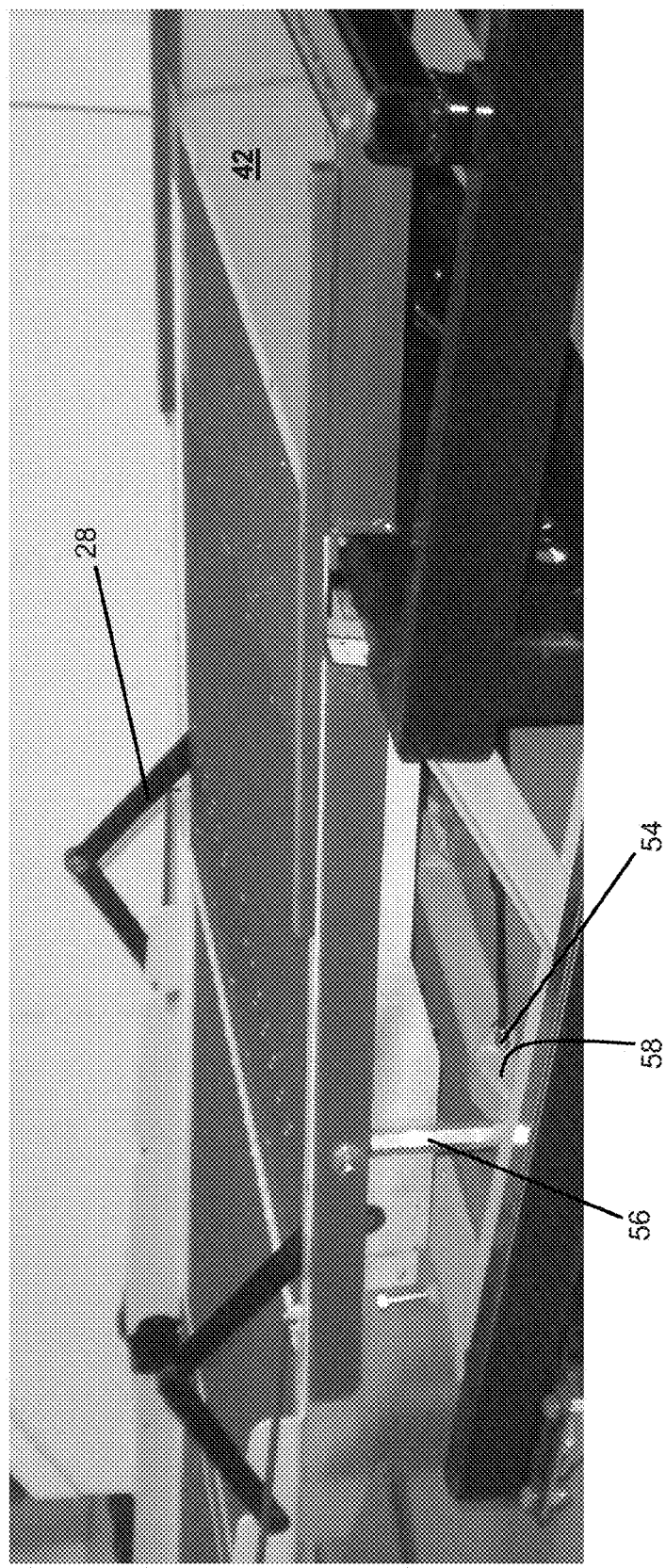
FIG. 12 is a view of the leveled ramp as viewed from the top looking aft and outboard if it were installed on a vehicle.

FIGS. 10, 11, and 12 depict other views of actuating assembly 50. Referring to FIG. 10, the space between the underside of panel 21 and the top side of tray 32 is shown. A centrally located actuator 52 is coupled on one end to static support 30 (or in some embodiments, frame 18), and pivotally coupled on the other end to actuated platform 58. Actuator 52 includes a ball screw actuator 52.1 that is driven by an electric motor 52.2. Motor 52.2 is provided voltage under the control of electronic controller 80.

As ball screw actuator 52.1 extends, actuated platform 58 is pushed further away from the vehicle. Because of the geometry of coupling link 56, this increased distance causes coupling link 56 to become more vertically oriented (in contrast to the position of link 56 in FIG. 8). As link 56 becomes more vertical, the link pushes against the top side of tray 31 (via a load path through actuated platform 58) and pushes upward against panel 21. It is understood that the particular geometry of actuator 52, platform 58, and link 56 result in the relationship of actuator extension causing uplift in panel 21. However, it is understood that other geometries are contemplated by the present invention. Preferably, the underside of actuated platform 58 contacts the top surface of tray 32 by a plurality of rollers or wheels.

Some embodiments of the present invention include one or more gas struts 54 that assist in operation of actuator 52. As one example, gas struts 54 are biased to the extended position, thus biasing platform 58 away from vehicle 18. In one embodiment, each gas strut 54 provides a biasing force of about 100 pounds. Note that gas struts 54 are adapted and configured to provide an assisting force during deployment of the panels of the ramp assembly, and further to provide a resisting force to the stowing of the panels. In some embodiments, some portions of the act of stowing the panel are gravity-assisted, and such panel weight is supported by the gas struts as they compress.

Figure 13:
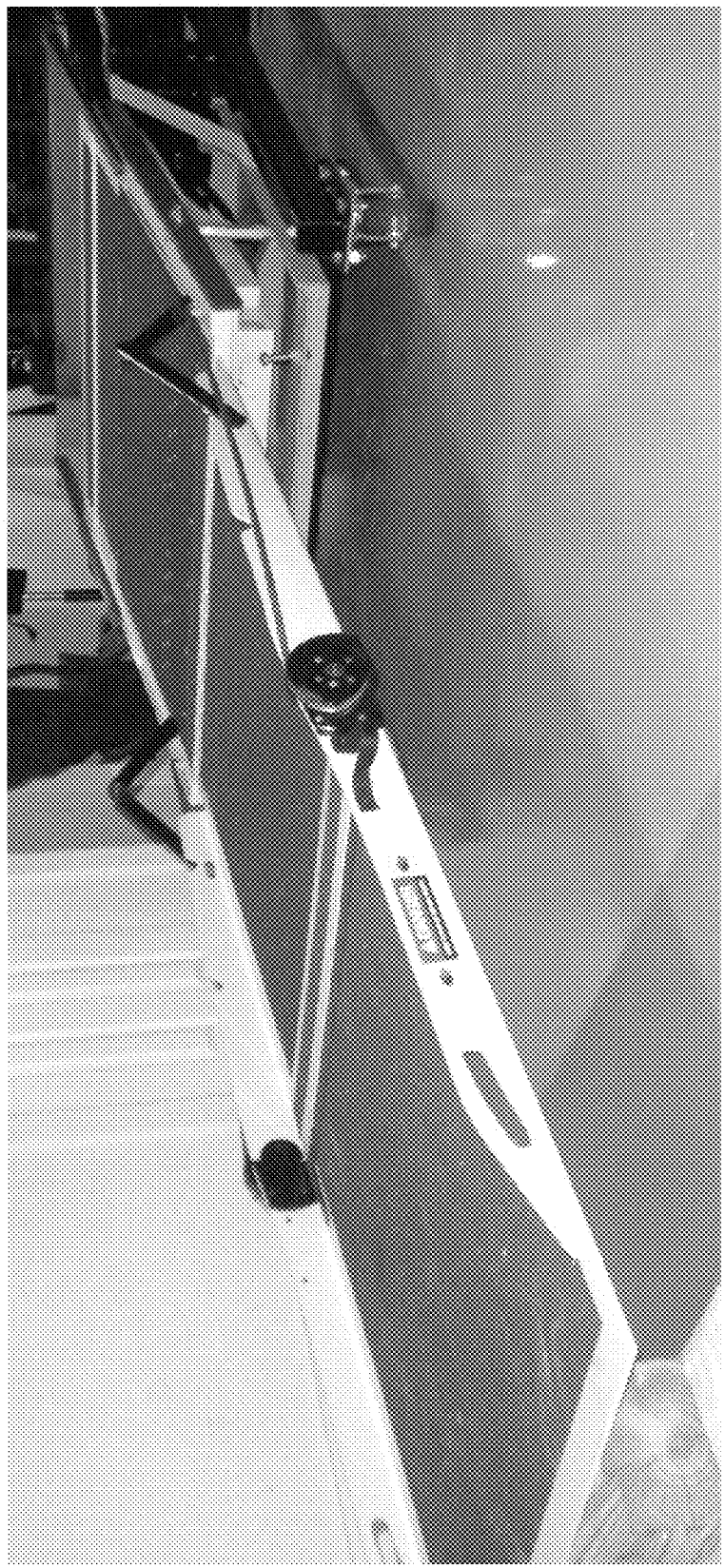
FIG. 13 is a view of the leveled ramp of FIG. 12.
Figure 14:
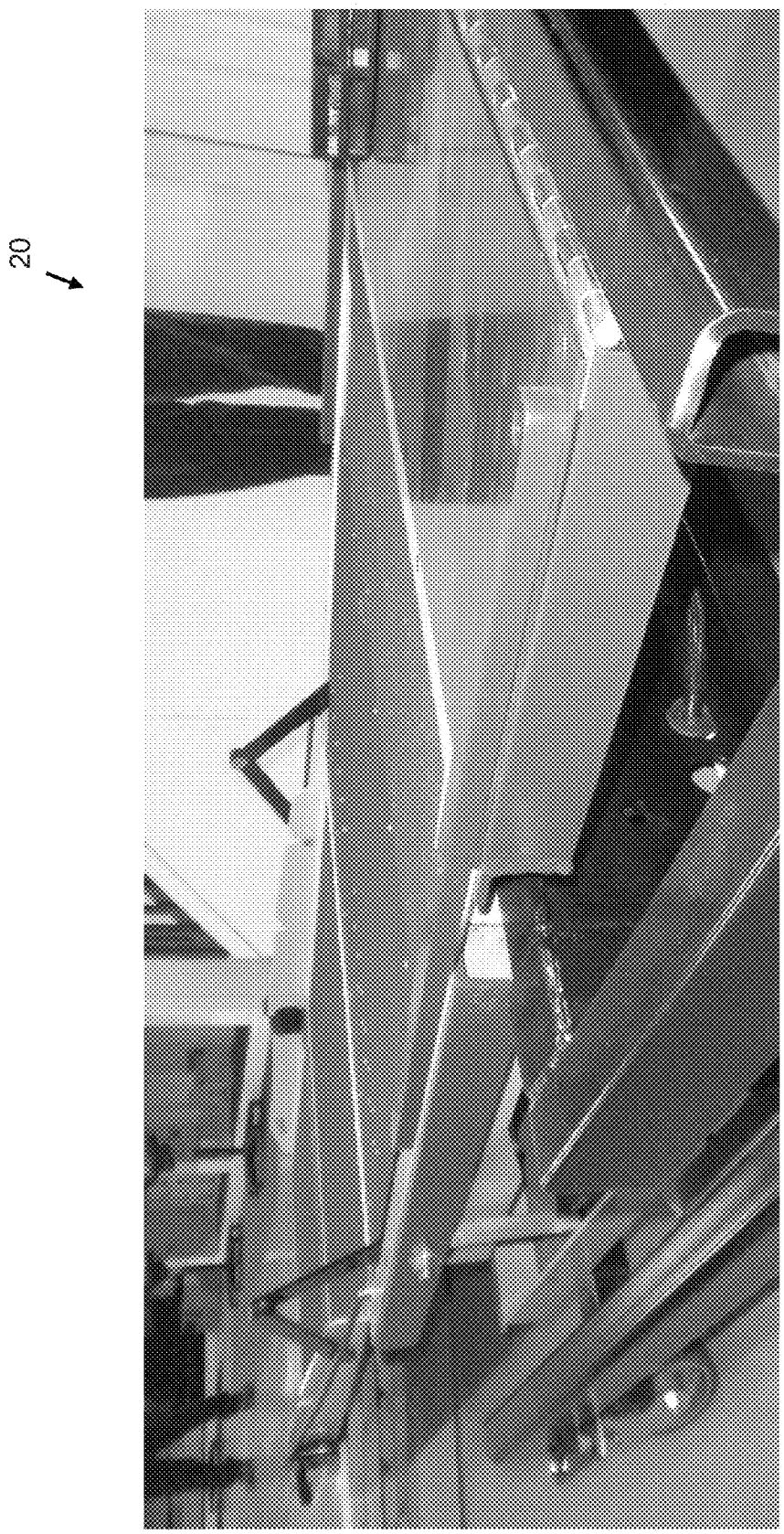
FIG. 14 is a photographic representation of the ramp of FIG. 12 looking aft and outboard if it were installed on a vehicle.

FIGS. 13 and 14 are photographic representations of the deployed ramp assembly 20 in its final state. In comparison to the initial deployed state (FIGS. 8 and 9), it can be seen that the angular relationship between panels 21 and 22 is substantially flat, and further that the angular relationship between the vehicle floor and panel 21 is closer to 180 degrees, both as a result of actuation of system 50. This actuation will now be described.

FIGS. 10 and 11 schematically depict sensors utilized in some embodiments of the present invention. FIG. 10 shows a ramp inclination sensor 62 that is coupled to the underside of panel 21. Sensor 62 includes apparatus that cooperate with an electronic controller 80 to provide an electronic signal representative of the inclination of panel 21 relative to Earth's gravity. FIG. 11 shows the two components of a panel angular position sensor 60 that cooperate with electronic controller 80 to provide a signal that corresponds to the angular relationship between two adjacent panels, in this case between panels 21 and 22. One member 60.1 of sensor 60 is coupled to panel 22. The other member 60.2 is coupled to panel 21. In one embodiment, one of the two members is a Hall Effect sensor, and the other of the two members provides a reference surface. It is understood that the reference member of sensor 60 does not need to be a separate component, and may also be an existing surface of the second panel. The angular relationship between these two members provides a signal corresponding to the angular relationship between the two members.

Figure 15:
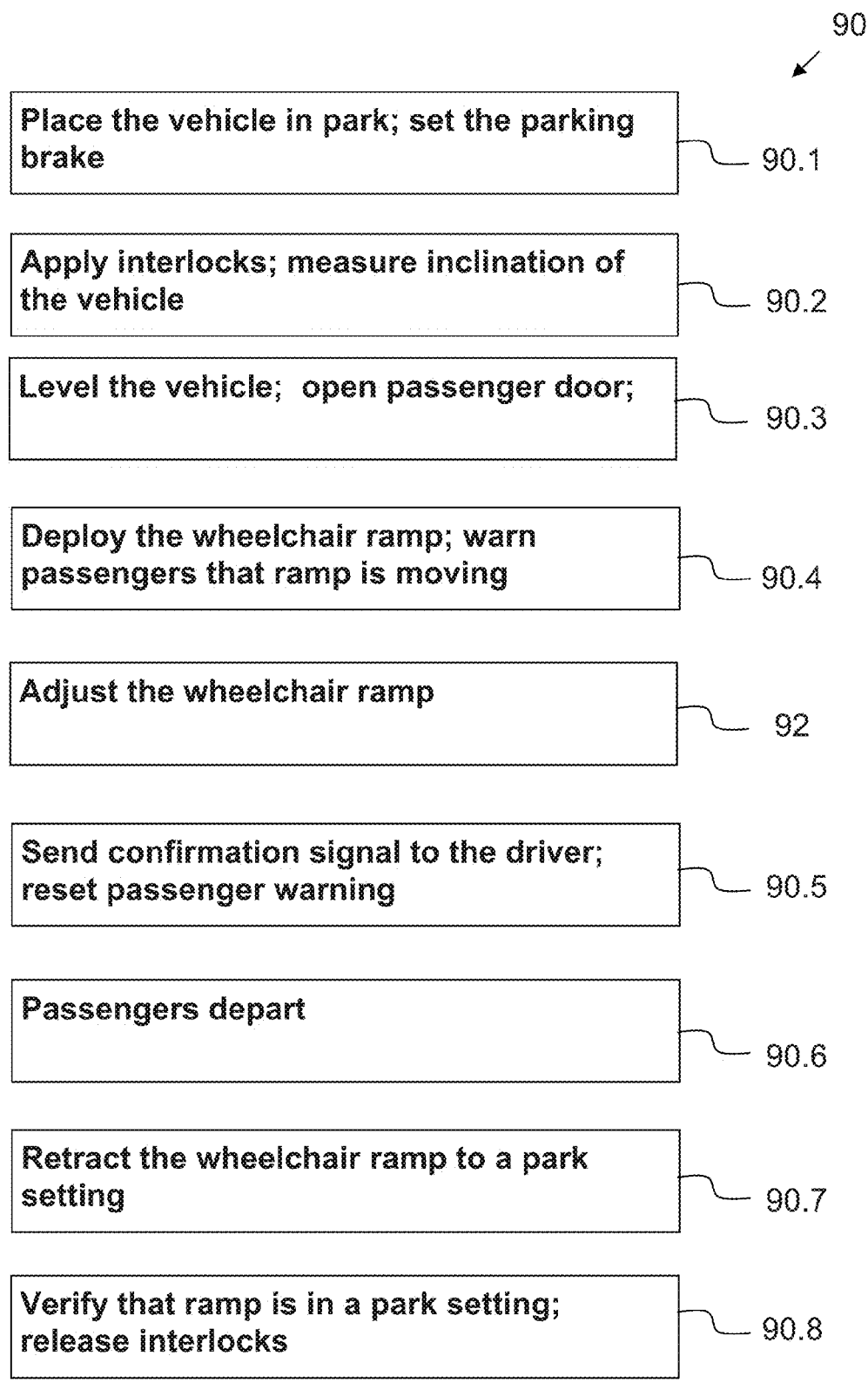
FIG. 15 is an algorithm according to one embodiment of the present invention.
Figure 16:
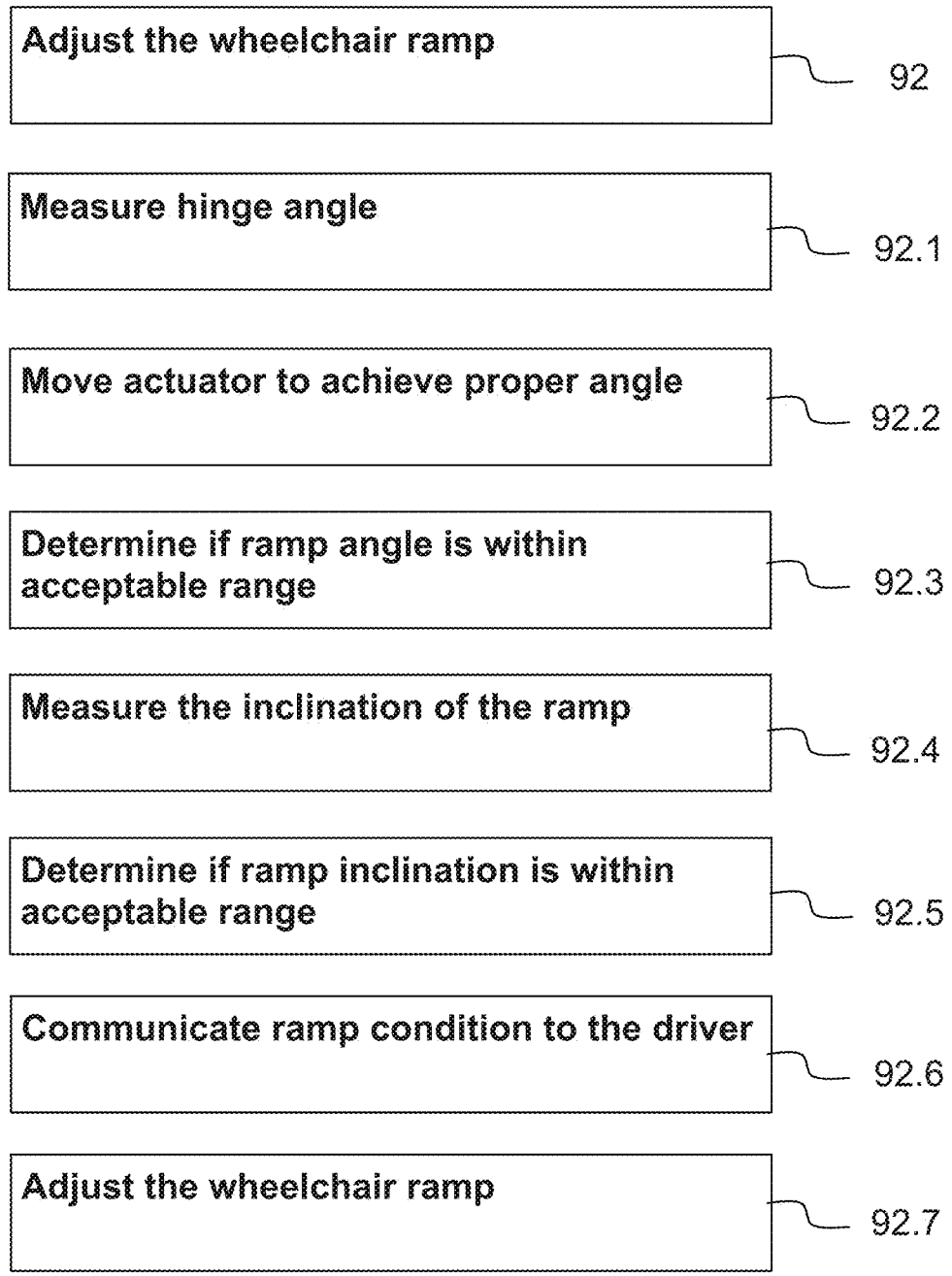
FIG. 16 is an algorithm according to one embodiment of the present invention.

FIGS. 15 and 16 present a simplified logic diagram of algorithms 90 and 92. Algorithm 90 pertains to overall operation of the vehicle when a ramp deployment is desired. Algorithm 92 is a subset of algorithm 90, and pertains to the logic involved in adjusting the configuration of the wheelchair ramp prior to usage of the deployed ramp by the passengers. FIGS. 15 and 16 present these algorithms 90 and 92 in one order, but it is understood that other embodiments of the present invention contemplate a different order to the individual acts of the algorithms.

Algorithm 90 as shown in FIG. 15 begins with the driver selecting a suitable location for ramp deployment, driving the vehicle to that location, and placing the vehicle in park, as shown in act 90.1. In act 90.2, one or more electronic controllers of the vehicle sense that the transmission is in park and that the parking break is applied. Accordingly, various interlocks (whether expressed as logical interlocks in software or as analog electronic signals sent to an actuator such as a solenoid) that would otherwise prevent deployment of the wheelchair ramp or set to a state that will permit ramp deployment. With the vehicle in a parked configuration, one or more on-board electronic controllers measure the inclination of the vehicle relative to the Earth's gravity field. In some embodiments, transit bus 10 includes a vehicle inclination sensor 64 located on the frame of the vehicle, and in some embodiments located under the driver's seat 13.

Inclination sensor 64 provides an electronic signal corresponding to the inclination of the sensor (and vehicle frame) relative to gravity in one or two directions. In some embodiments, the inclination is measured on a left to right (roll) basis, whereas in other embodiments the inclination is measured on a fore and aft (pitch) basis. In still further embodiments, the inclination sensor operates along two axes, and provides both roll angle and pitch angle information.

After the vehicle is parked, the driver actuates 90.3 an electronic controller to level the vehicle as best as possible. Preferably, transit bus 10 is supported by a suspension system 12 at each wheel that includes an airspring 14. With act 90.3 an electronic controller applies a leveling algorithm to achieve a position of the vehicle frame that is within a range of acceptable angular offsets. As one example, in some embodiments, the inclination sensor 64 measures the roll angle of the vehicle, especially for those vehicles that are parked on a roadway that is crowned. In such a parked configuration, the left side of the vehicle can be higher than the right side of the vehicle (since the crown at the middle of the road is higher than at the outer edge of the road). Such a situation is detected by the on-board controller in response to receiving the signal from sensor 64. The electronic controller will inflate one or more right side air springs 14 and deflate one or more left side air springs 14. Likewise, for a vehicle parked as a pitch angle, electronic controller will inflate or deflate the front air springs 14 relative to the rear air springs 14.

It is understood that any such inflation or deflation can only be accomplished within limits pertaining to parameters such as the acceptable range of air spring pressures, the range of suspension travel before jounce or rebound stops are reached, the steering angle of the front wheels, and similar factors. Because of all of these constraints, act 90.3 may not be able to achieve a level vehicle. In such cases act 90.3 achieves the best level state possible.

With the vehicle level, the driver can open the passenger door 16 as shown in FIG. 2. Once the door is open, the driver can take those actions necessary to deploy the wheelchair ramp 20 as shown by act 90.4. To provide increased safety to the passengers, one or more passenger warning enunciators 68 (such as flashing lights and/or sounds) are actuated to warn passengers that the ramp is moving and is not yet in a fully deployed state. Further, one or more driver enunciators 66 can also be actuated to indicate the state of deployment, and whether or not the ramp is ready for passenger usage.

In some embodiments, wheelchair ramp assembly 20 comprises first, second, and third panels (21, 22, and 23, respectively), each of which is hinged together. In such embodiments the ramp assembly 20 unfolds from its stowed position to the deployed position, as seen in FIGS. 6 and 7. The innermost panel 21 is hingedly attached to the frame 18 or other static structure of bus 10. The most opposite, most outward edge of third panel 23 contacts a surface outside of the vehicle, such as a curb, step, roadway, or ground, as examples, as seen in FIGS. 8 and 9. After the initial unfolding has completed, the deployed ramp 20 extends from inside the vehicle to the surface outside of the vehicle.

However, because of the uncertainties in the inclination of the vehicle and further in the distance from the frame panel hinge 26 to the outside surface 7, it is possible that the first, second, and third panels 21, 22, and 23 are not in a straight line. In such a condition, as best seen in FIGS. 8 and 9, a person using the wheelchair ramp would have a first degree of effort in traversing one or more of the panels, and a second, different degree of effort in traversing the remaining panels, since the panels are at various inclinations. In some embodiments, ramp 20 deploys such that panels 22 and 23 tend to be aligned better than panels 21 and 22. What will be described now is an algorithm and apparatus for altering this internal angular relationship, it being understood that the non-flat angular condition can exist between any two of the panels, and further between all three panels. In the latter case, a second ramp static support 30 and second actuation system 50 may be desirable.

When ramp assembly 20 is fully deployed, a sensor on the assembly indicates to an electronic controller that the unfolding process is complete. After completion, electronic controller 80 measures the angular relationship between panels 21 and 22 by means of an angular position sensor 60. Sensor 60 has a first member that moves with the motion of panel 21 and a second member that moves with the movement of second panel 22, provide a signal corresponding to relative panel movement. Sensor 60 determines the angular difference between its two members, and provides an electronic signal to controller 80.

In some embodiments, angular position 60 is a Hall Effect sensor, which magnetically senses the relative angular position of panels 21 and 22. However, it is understood that any kind of sensor can be used, including, by way of example, one or more radiation sources (such as LEDs), the radiation of which is received by one or more detectors; a variable resistor, the resistance of which is an indication of the included angle between panels 21 and 22; one or more contact switches which are located to make or break contact when the relative angular position is within certain boundaries; two inclination sensors, the difference between which is a measure of panel relative angle; and others. It is understood that position sensor 60 can transduce the relative angular position of panels 21 and 22 in any manner.

In some embodiments, there is further an angular position sensor that provides a visual indication of angular position for the driver or passenger. As one example, the mating hinged parts of panels 21 and 22 can each include one or more tick lines spaced apart, the alignment of which indicates an acceptable included angle.

Controller 80 receives a signal from sensor 20 corresponding to a ramp angle, and determines whether or not that angle is within an acceptable range. Preferably, the angle should be 180 degrees, or substantially flat. However, it is understood that for purposes of providing hysteresis and eliminating hunting by the control system, that there can be a range of acceptable angles, such as from 178 degrees to 182 degrees. Further, it is understood that in some embodiments the electronic controller does not attempt to achieve a flat condition between panels 21 and 22, but rather attempts to achieve a best possible angle between these two panels.

If the ramp angle is not acceptable, then act 92.3 includes the actuation of system 50 to provide an acceptable ramp angle 42. In one embodiment, system 50 includes a ball screw actuator 52, one end of which is coupled to static support 30 (or alternatively, to frame 18), the other end of which is coupled to link 56. Electronic controller 80 drives actuator 50 to move link 56, and thereby adjusts the relative angle 42 between panels 21 and 22 until an acceptable angular position is read from sensor 60. The leveled ramp can be seen in FIGS. 12, 13, and 14.

Once ramp angle 42 is within an acceptable range, electronic controller 80 then reads a signal from ramp inclination sensor 62 that corresponds to the inclination of one or more panels relative to the Earth's gravity field. Controller 80 determines if the measured inclination is within acceptable limits in act 92.5. If the inclination is within acceptable limits, then controller 80 communicates an acceptable condition of the ramp to the driver and passengers by way of one or more enunciators 66 or 68. Passengers can then disembark.

If the ramp inclination is too steep, then one or more enunciators 66 or 68 relay this information to the driver or passengers, indicating that passengers should not leave the vehicle on their own. In such cases the driver leaves the driver's seat, comes over to the side door 16, and manually helps the passenger traverse the deployed ramp.

In yet other embodiments, ramp assembly 20 and transit bus 10 include one or more means for manually adjusting the position of one or more of the ramp panels. For example, such a system can include a mechanical jacking mechanism to support one or more panels relative to the ground. In yet other embodiments, the panel hinges can include a ratcheting lock that permits manual adjustment of one panel relative to another panel, with a ratcheting device holding that position constant as the passenger exits the vehicle. In such cases, ramp assembly 20 can include a visual or manual method for determining inclination, such as a rotating weight that swing to a position within a marked housing, the difference between the end of the swinging pendulum and the markings of the housing being an indication of the inclination of the particular panel.

Figure 17:
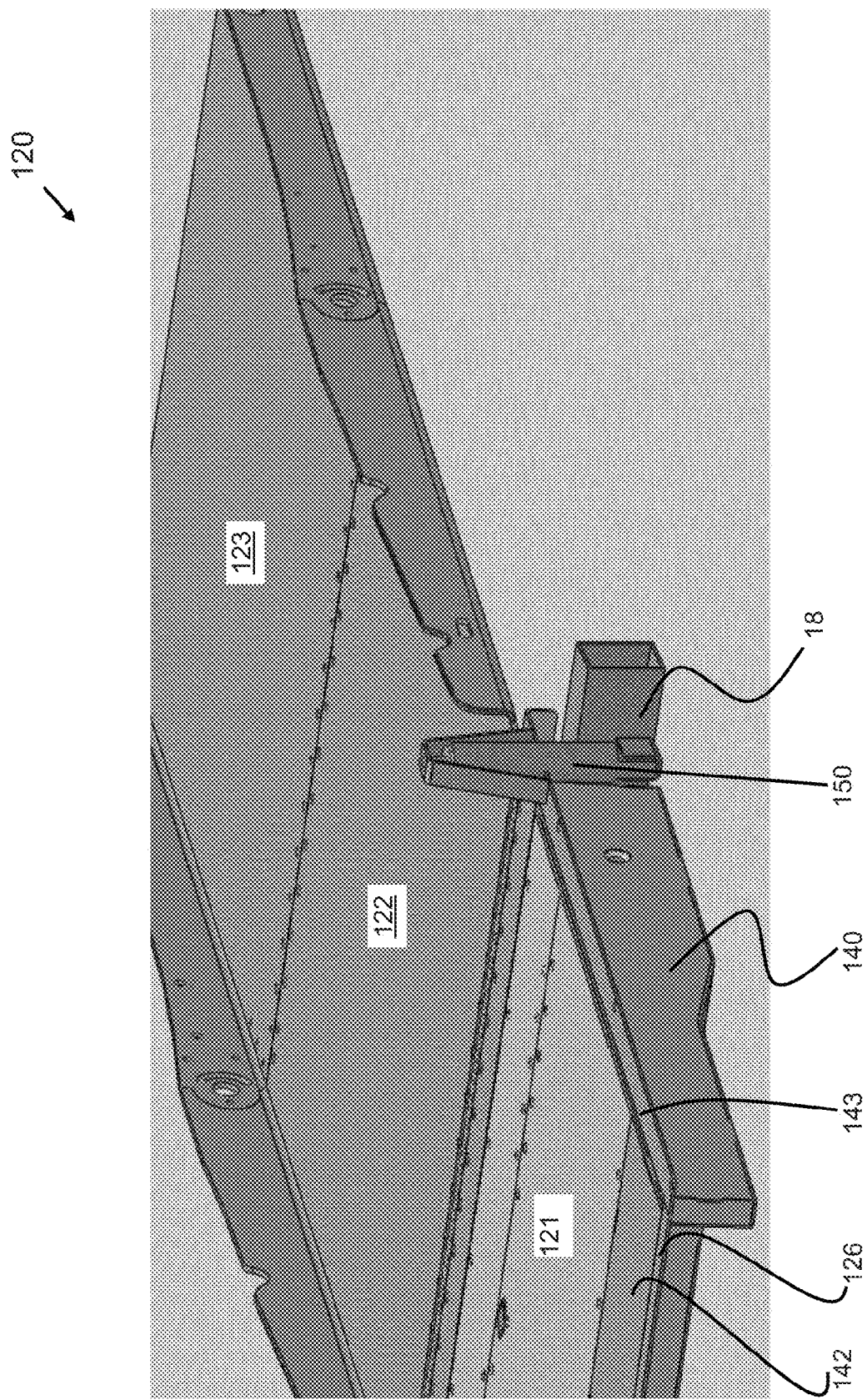
FIG. 17 is a top, right side perspective view of a ramp assembly according to another embodiment of the present invention, right side being with reference to a person egressing the vehicle (i.e., the aft side with regards to the fore and aft direction of the vehicle).

FIGS. 17-20 are CAD drawings of a wheelchair ramp assembly according to yet another embodiment of the present invention. These figures depict a wheelchair ramp assembly 120 that includes an actuation system 150 that does not include, in some embodiments, a static support tray 32. As best seen in FIG. 17, ramp assembly 120 includes a plurality of hinged, articulating panels 121, 122, and 123 that are substantially the same as panels 21, 22, and 23 previously described.

Panel 121 is supported by a ramp support assembly 140. Panel 121 is coupled to support assembly 140 by a pair of clamps 143 that extend along the edges of panel 121. Support assembly 140 further includes a bed plate 142 that receives support clamps 143, and hingedly connects to frame 18 of bus 10 by way of hinge 126

It is understood that support assemblies 40 and 140 provide an interface between a transit bus and a plurality of different configurations of wheel chair ramps and lifts. Bed plates 42 and 142 in some embodiments, incorporate a plurality of fastener types and fastener locations that can accommodate different configurations of side clamps 43 and 143, respectively. In this manner, a vehicle 10 can be modified with a bed plate 42 or 142, and then interface with different wheelchair ramps or lifts as desired by the bus operator.

Figure 18:
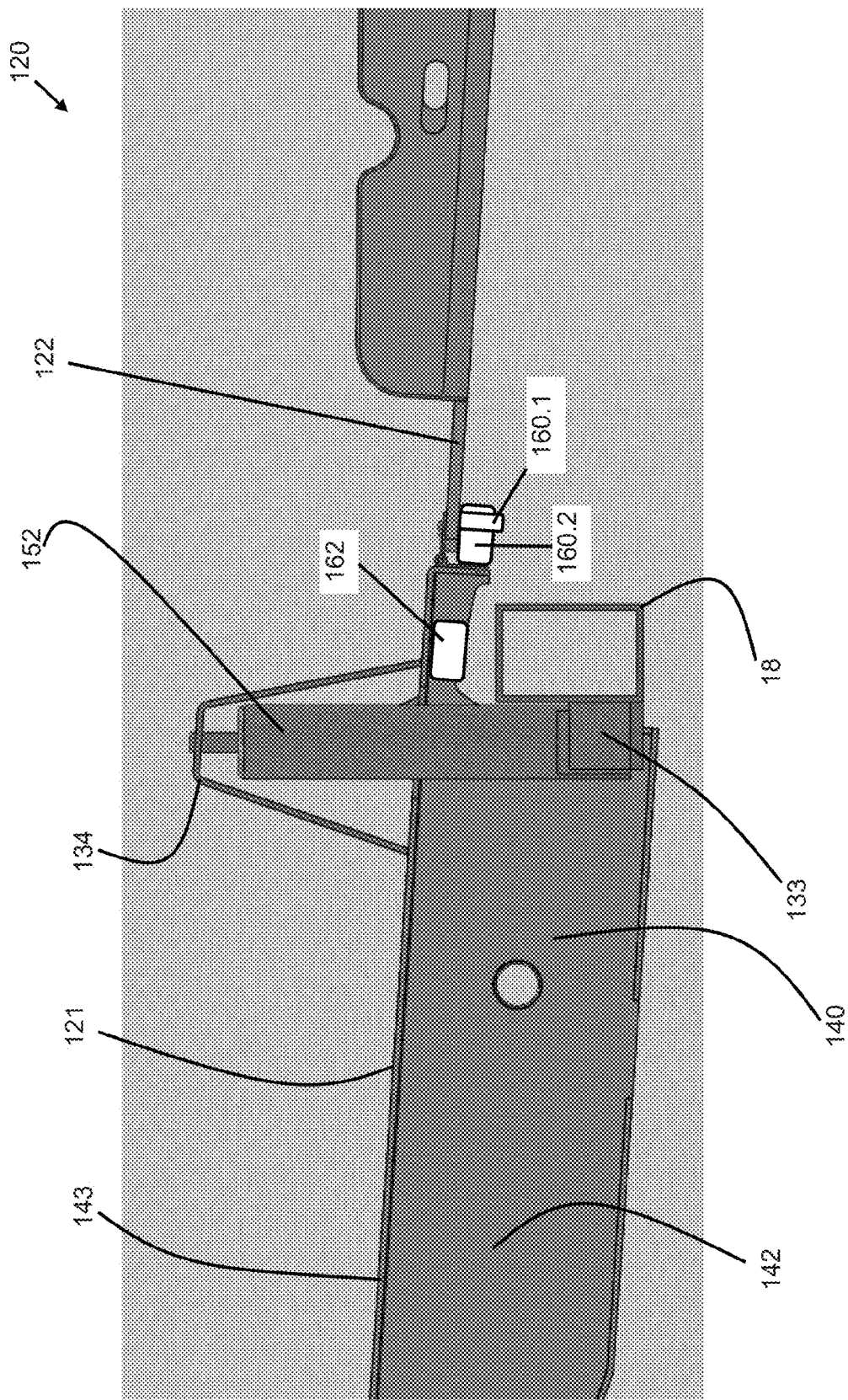
FIG. 18 is a right side elevational view (looking forward) of a portion of the apparatus of FIG. 17.
Figure 19:
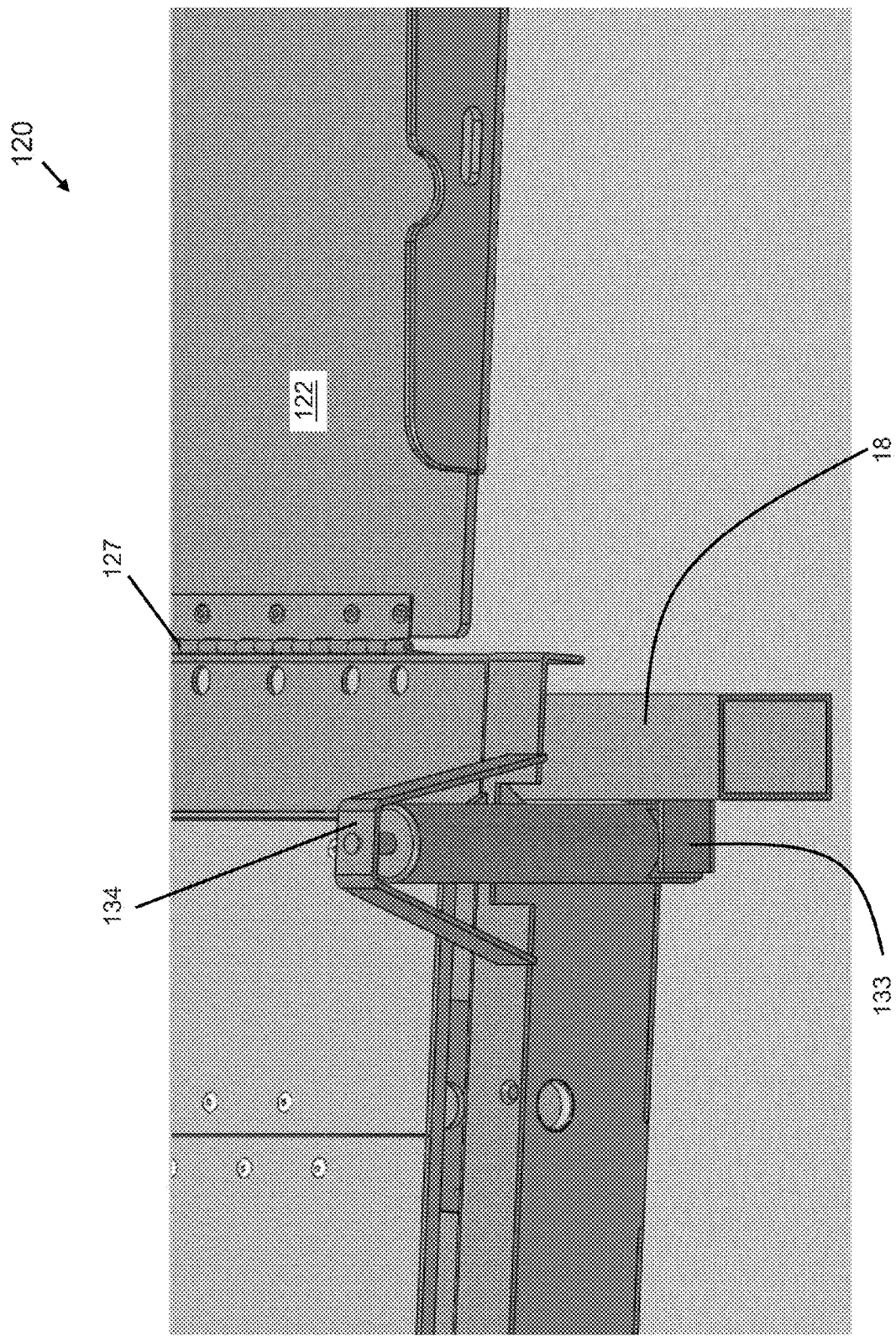
FIG. 19 is a top, right side perspective view of the apparatus of FIG. 18.

As best seen in FIGS. 18 and 19, ramp assembly 120 includes an actuation system 150 that includes an actuator 152 coupled at one end to frame 18 via support brace 33, and coupled at the other end to bed plate 142 by way of bracket 134. Preferably, each end of the actuator is coupled to brackets 133 and 134 by way of joints that permit pivoting. It is understood that actuator 150 can be electrical (such as a ball screw actuator), hydraulic or pneumatic, as examples. In the case of hydraulic actuators, the source of hydraulic pressure can be the ramp actuation system 124 that provides for deployment and stowing of the panels 121, 122, and 123, panel 122 having a hinge 127 at one end. For those embodiments in which the actuator is pneumatic, the source of gas pressure can be the vehicle pneumatic system that operates the air springs 14.

Referring to FIG. 18, it can be seen that extension of actuator 152 will cause an increased separation between brackets 133 and 134. In this manner, bed plate 142 and panel 121 are lifted relative to frame 18. This further changes the angular relationship between panels 121 and 122. In FIG. 18, the two panels 121 and 122 are substantially flat, a result of actuator 152 being driven by the ramp adjustment and ramp inclination algorithms of the electronic controller 180. In one embodiment, electronic controller 180 receives a signal from sensor 160 that corresponds to the included angle between panels 121 and 122. In still further embodiments, electronic controller 180 receives a signal from ramp inclination sensor 162 that corresponds to the inclination of panel 121 relative to Earth's gravity (it being understood that ramp inclination sensor can be attached to any of the panels 121, 122, or 123, as well as to bed plate 142).

Figure 20:
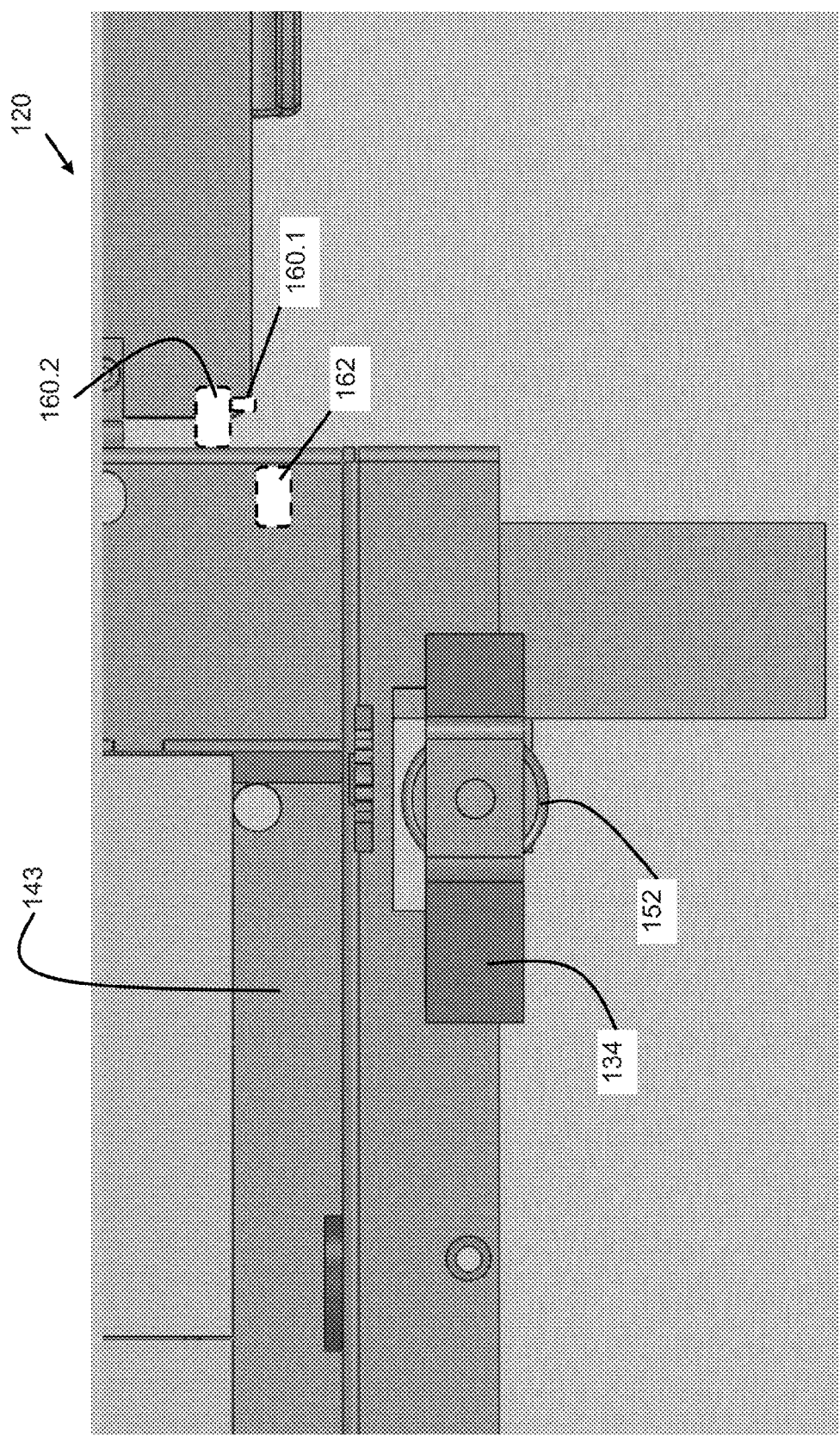
FIG. 20 is a top plan view of the apparatus of FIG. 19.

FIGS. 18 and 20 schematically depict sensors utilized in some embodiments of the present invention. FIG. 18 shows a ramp inclination sensor 162 that is coupled to the underside of panel 121. Sensor 162 includes apparatus that cooperate with an electronic controller 180 to provide an electronic signal representative of the inclination of panel 121 relative to Earth's gravity. FIG. 18 shows the two components of a panel angular position sensor 160 that cooperate with electronic controller 180 to provide a signal that corresponds to the angular relationship between two adjacent panels, in this case between panels 121 and 122. One member 160.1 of sensor 160 is coupled to panel 122. The other member 160.2 is coupled to panel 121. In one embodiment, one of the two members is a Hall Effect sensor, and the other of the two members provides a reference surface. The angular relationship between these two members provides a signal corresponding to the angular relationship between the two members.

Figure 21:
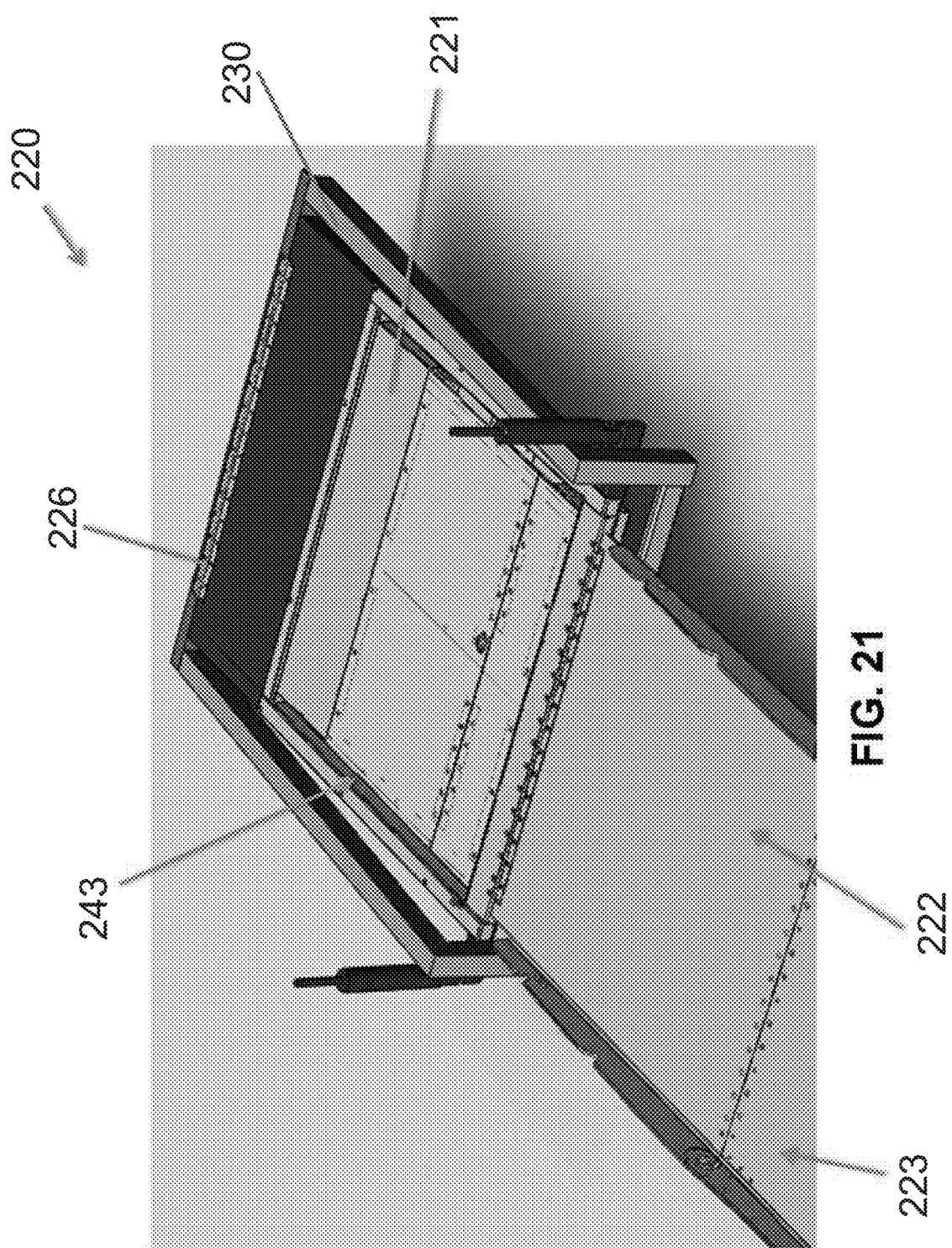
FIG. 21 is a perspective view of a computer-aided design (CAD) representation of a wheelchair ramp according to another embodiment of the present invention.
Figure 22:
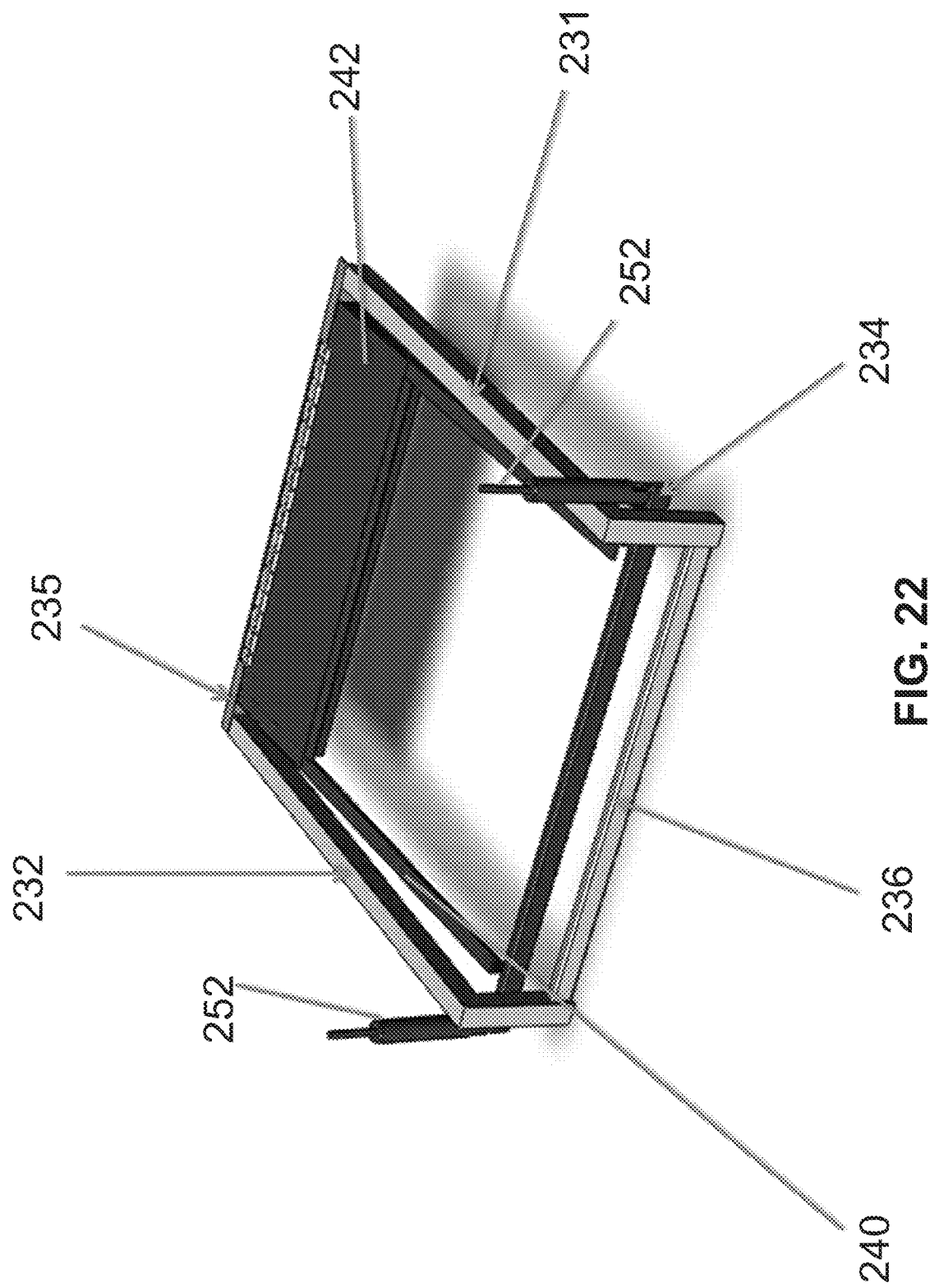
FIG. 22 is a portion of the apparatus of FIG. 21.

FIGS. 21 and 22 show an apparatus 220 according to yet another embodiment of the present invention. Ramp assembly 220 includes first, second, and third panels 221, 222, and 223, respectively, hinged together and coupled to a ramp static support 230. A hinge 226 connects a bed plate 242 to static support 230. Bed plate 242 is part of the ramp support assembly 240 that is further coupled to ramp static support 230 by an actuation system 250. In one embodiment, actuation system 250 includes a pair of linear actuators 252 that have a static actuating member attached to side braces 231 of tray 232, and a movable actuation system that is coupled to bed plate bracket 234. Referring to FIG. 22, it can be seen that actuation of system 250 (whether pneumatic, hydraulic, electric or manual) causes support plate assembly 240 to move in a pivoting fashion relative to static support 230. As discussed previously, the first panel 221 of ramp assembly 220 is coupled to bed plate 242 by a pair of side clamps 243 that sandwich the edges of plate 221 against the side members of support plate 240. In one embodiment, hinge support 235 has an L-configuration, with the shape being adapted and configured for placement against an attachment to (such as by welding) a longitudinal member of the truck frame. However, in yet other embodiments hinge support member 235 has a generally rectangular and closed cross sectional shape. Ramp assembly 220 further includes a cross member 236 extending between two sides of apparatus 220.

Figure 23:
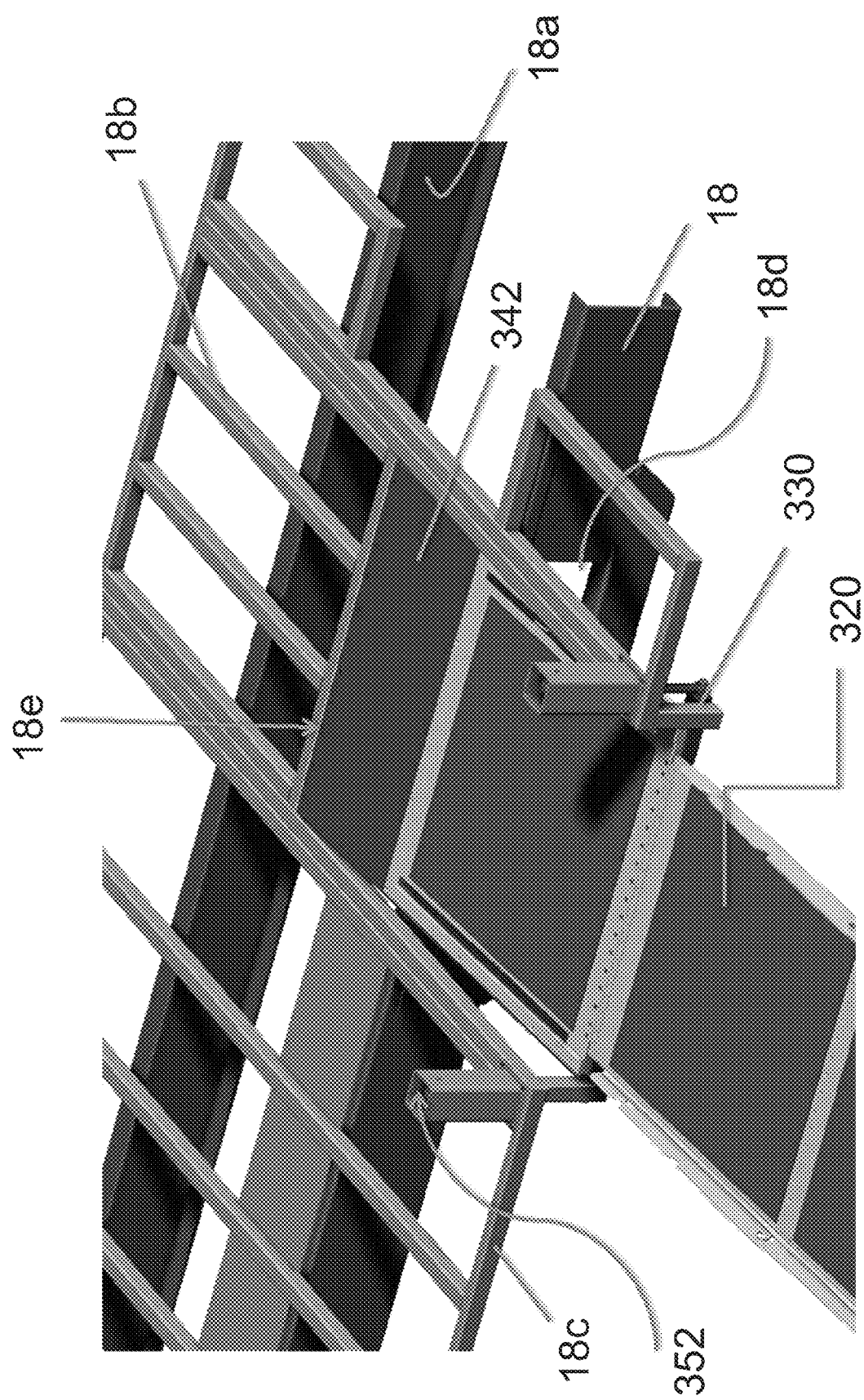
FIG. 23 is a perspective CAD representation of an apparatus according to yet another embodiment of the present invention.

FIG. 23 shows a ramp assembly 230 coupled into a frame 18 of a transit bus 10. it can be seen that frame 18 includes a main pair of main longitudinal members 18*a* connected to each other by a plurality of lateral member 18*b*. The ends of members 18*b* are further interconnected by outer longitudinal members 18*c*, this type of frame construction sometimes being referred to as "ladder frame" instruction. A ramp assembly 230 is shown located within a cut out 18*d*. A ramp static support assembly 330 is located beneath one of the panels of the ramp. Ramp assembly 320 includes an actuator 352.

Frame 18 has been modified to remove a portion of the length of several lateral members 18*b*, and to further include a hinge support member 18*e* that is oriented generally longitudinally. In some embodiments, longitudinal member 18*e* is the same as hinge support member 235, although in yet other embodiments member 18*e* is a member within frame 18 with bed plate 342 being hingedly coupled to member 18*e*.

Various aspects of different embodiments of the present invention are expressed in paragraphs X1, X2, X3, X4, and X5 as follows:

X1. One aspect of the present invention pertains to an apparatus for providing wheelchair access. The apparatus preferably includes a support frame; three substantially flat panels hinged together along a single axis; an actuator having a first member movable relative to a second member, with one of the first member or second member being coupled to said support frame and the other of said first member or said second member being coupled to one of said panels; and a sensor for sensing the relative position of said frame relative to said one panel.

X2. Another aspect of the present invention pertains to a multiwheeled ground vehicle comprising a frame; four wheels each supporting said frame from the ground by a suspension system, each suspension system including a spring in at least a portion of the load path from the corresponding wheel to said frame; a sensor providing an electronic signal responsive to the inclination of said frame; a deployable wheelchair assembly attached to said frame, said assembly being deployable from a stowed position within the vehicle to a deployed position extending out of the vehicle and in contact with the ground; and a controller receiving the signal and operable connected to said assembly for control of said assembly between the stowed position and the deployed position.

X3. Yet another aspect of the present invention pertains to a method for deploying a wheelchair access assembly from a ground vehicle, comprising: providing a deployable wheelchair assembly coupled to a frame, and deployable from a stowed position within the vehicle to a deployed position extending out of the vehicle, an electronic sensor providing a signal, a suspension system actuatable to change the inclination of the vehicle; sensing with the sensor the inclination of the frame relative to the ground; commanding the assembly to deploy; actuating the suspension system to change the inclination of the frame; and using the signal and moving the frame to a more level inclination.

X4. Still another aspect of the present invention pertains to a kit for retrofitting a transit bus, comprising: a frame; a structural member hinged to said frame and pivotal relative to said frame; an actuator attached to said member and actuatable for pivoting said member relative to said frame; a multisection folding wheelchair ramp, said ramp being attached to said member; and an electronic sensor providing a signal corresponding to the position of a section of said ramp.

X5. Still another aspect of the present invention pertains to an apparatus, comprising: a transit bus having a frame; a multisection deployable wheelchair ramp pivotally coupled to said frame, the fully deployed sections of said ramp capable of being used for wheelchair ingress and egress over a plurality of angular relationships; means for deploying said ramp from said vehicle; and means for pivoting one section of said ramp relative to another section of said ramp over a range of angular relationships.

Yet other embodiments pertain to any of the previous statements X1, X2, X3, X4 or X5, which are combined with one or more of the following other aspects. It is also understood that any of the aforementioned X paragraphs include listings of individual features that can be combined with individual features of other X paragraphs.

Wherein said sensor provides an electronic signal corresponding to the relative angular position.

Wherein the other member is coupled to the middle panel.

Wherein the other member is coupled to one of the end panels.

The apparatus or method of any of the above claims wherein the support frame is the frame of a vehicle.

Wherein the support frame is adapted and configured to be attached to the ladder frame of a vehicle.

Wherein said sensor is located proximate to the driver's seat.

Wherein said sensor is attached to said frame.

Wherein said sensor is located in the cab of the vehicle.

Wherein said springs are air springs.

Wherein said assembly is a wheelchair lift.

Wherein said assembly is a foldable wheelchair ramp.

Wherein said assembly is a sliding wheelchair ramp.

Wherein the inclination of said frame is relative to the gravity field of Earth.

Wherein the inclination of said frame is relative to at least one of said wheels.

Wherein said actuating is automatic in response to said commanding.

Wherein said actuating is performed by the vehicle operator.

Wherein said sensing and said using is by an electronic controller.

Wherein the suspension system is an air spring suspension system, and said actuating is by changing the air pressure with one of the air springs.

Which further comprises preventing said actuating unless the vehicle is placed in park.

Wherein said member is hinged to one end of said frame and said actuator is pivotally coupled to said member and spaced apart from the hinged attachment.

Wherein the other end of said actuator is attached to said frame.

Wherein said sensor provides a signal corresponding to the position of one section of said ramp relative to another section of said ramp.

Wherein said sensor provides a signal corresponding to the angular relationship of one section of said ramp relative to another section of said ramp.

Wherein said frame has a width that is greater than or about equal to the folded length of said ramp.

Which further comprises a software algorithm for using the signal to control the actuator.

Which further comprises means for supporting the pivoted sections within the range of angular relationships.

Wherein said supporting means and said pivoting means utilize the same actuator.

Wherein said pivoting means uses a first actuator to vary the relative pivoting and said The apparatus or method of any of the above claims supporting means uses a locking actuating lockable at any of a plurality of discrete locations within the range of angular relationships.

Which further comprises a sensor providing a signal corresponding to the inclination of said frame relative to gravity.

Which further comprises a sensor providing a signal corresponding to the relative relationship of one section relative to another section.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

The invention claimed is:

1. A method for deploying a deployable wheelchair access assembly from a ground vehicle, comprising:
providing said deployable wheelchair access assembly coupled to the vehicle and including a platform having at least two substantially flat panels movable relative to one another and adapted and configured for supporting a person on a wheelchair and deployable from a stowed position within the vehicle to a deployed position extending out of the vehicle, an electronic sensor providing a signal, and a suspension system of the vehicle being actuatable to change the inclination of the vehicle;

sensing with the sensor the inclination of the vehicle relative to the ground;

actuating the suspension system and changing the inclination of the vehicle;

using the signal and moving the vehicle to a more level inclination;

deploying the wheelchair access assembly after said moving;

detecting an angular misalignment of one said panel relative to another said panel after said deploying, and reducing the angular misalignment.

2. The method of claim 1 wherein the electronic sensor is a first sensor, said providing includes a second electronic sensor, and which further comprises sensing with the second electronic sensor the inclination of the wheelchair access assembly relative to the ground.

3. The method of claim 1 wherein said providing includes an electronic controller receiving the signal wherein said moving is automatically controlled by said controller.

4. The method of claim 1 wherein said providing includes a separately actuatable air spring supporting each wheel of the vehicle, and said actuating includes adjusting the air pressure of at least one air spring to a lowered position and adjusting the air pressure of at least one other air spring to a higher position.

5. The method of claim 1 wherein said changing the inclination is the roll inclination of the vehicle, and after said moving the vehicle is more level about the roll axis.

6. The method of claim 1 wherein said providing includes a driver's compartment having at least one of a visual enunciator or an audio enunciator, and which further comprises enunciating the deployment status of the assembly after said reducing.

7. The method of claim 1 wherein the electronic sensor is a first sensor, said providing includes a second electronic sensor, and said detecting is with the second electronic sensor.

8. The method of claim 1 wherein said one panel and said another panel are hinged to each other at a hinge angle, and said detecting is of the hinge angle.

9. The method of claim 1 wherein the vehicle is a wheeled ground vehicle including a ladder frame having a pair of opposed, longitudinal members, and said deployable wheelchair access assembly is coupled to a longitudinal member of the ladder frame.

10. A method for deploying a deployable wheelchair access assembly from a ground vehicle, comprising:

providing said deployable wheelchair access assembly coupled to the vehicle and including a platform having at least two substantially flat panels movable relative to one another and adapted and configured for supporting a person on a wheelchair and deployable from a stowed position within the vehicle to a deployed position extending out of the vehicle, a first electronic sensor providing a first signal, a second electronic sensor providing a second signal, and a suspension system of the vehicle being actuatable to change the inclination of the vehicle;

sensing with the first sensor the inclination of the vehicle relative to the ground;

actuating the suspension system and changing the inclination of the vehicle;

using the first signal and moving the vehicle to a more level inclination;

deploying the wheelchair access assembly after said moving; and sensing with the second electronic sensor the inclination of the deployed wheelchair access assembly relative to the ground after said deploying.

11. The method of claim 10 wherein said providing includes an electronic controller receiving the first signal wherein said moving is automatically controlled by said controller.

12. The method of claim 10 wherein said providing includes a separately actuatable air spring supporting each wheel of the vehicle, and said actuating includes adjusting the air pressure of at least one air spring to a lowered position and adjusting the air pressure of at least one other air spring to a higher position.

13. The method of claim 10 which further comprises detecting an angular misalignment of one said panel relative to another said panel after said deploying, and reducing the angular misalignment.

14. The method of claim 10 wherein said changing the inclination is the roll inclination of the vehicle, and after said moving the vehicle is more level about the roll axis.

15. The method of claim 10 wherein said providing includes a driver's compartment having at least one of a visual enunciator or an audio enunciator, and which further comprises enunciating the deployment status of the assembly after said deploying.

16. The method of claim 10 wherein the vehicle is a wheeled ground vehicle including a ladder frame having a pair of opposed, longitudinal members, and said deployable wheelchair access assembly is coupled to a longitudinal member of the ladder frame.

\* \* \* \* \*